US005522025A

United States Patent [19]

Rosenstein

[11] Patent Number: 5,522,025

[45] Date of Patent: May 28, 1996

[54] OBJECT-ORIENTED WINDOW AREA DISPLAY SYSTEM

[75] Inventor: Larry S. Rosenstein, Santa Clara, Calif.

[73] Assignee: Taligent, Inc., Cupertino, Calif.

[21] Appl. No.: 142,894

[22] Filed: Oct. 25, 1993

[51] Int. Cl.$^6$ .................................................. G06F 3/14

[52] U.S. Cl. .................................... 395/158; 395/157

[58] Field of Search ............................ 395/155, 157, 395/158, 160, 161, 133, 135; 345/119, 120, 113

[56] References Cited

U.S. PATENT DOCUMENTS

| | | | |
|---|---|---|---|
| 4,555,775 | 11/1985 | Pike | 395/158 |
| 4,821,220 | 4/1989 | Duisberg | 364/578 |
| 4,885,717 | 12/1989 | Beck et al. | 364/900 |
| 4,891,630 | 1/1990 | Friedman et al. | 340/706 |
| 4,914,607 | 4/1990 | Takanashi et al. | 395/158 |
| 4,953,080 | 8/1990 | Dysart et al. | 364/200 |
| 4,954,818 | 9/1990 | Nakane | 345/120 |
| 5,041,992 | 8/1991 | Cunningham et al. | 364/518 |
| 5,050,090 | 9/1991 | Golub et al. | 364/478 |
| 5,060,276 | 10/1991 | Morris et al. | 382/8 |
| 5,062,060 | 10/1991 | Kolnick | 395/159 |
| 5,072,412 | 12/1991 | Henderson, Jr. et al. | 395/159 |
| 5,075,848 | 12/1992 | Lai et al. | 395/425 |
| 5,093,914 | 3/1992 | Coplien et al. | 395/700 |
| 5,119,475 | 6/1992 | Smith et al. | 395/156 |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,151,987 | 9/1992 | Abraham et al. | 395/575 |
| 5,181,162 | 1/1993 | Smith et al. | 364/419 |
| 5,216,413 | 6/1993 | Seiler et al. | 345/120 |
| 5,293,470 | 3/1994 | Birch et al. | 395/135 |
| 5,371,847 | 12/1994 | Hargrove | 395/157 |
| 5,388,200 | 2/1995 | McDonald et al. | 395/157 |

FOREIGN PATENT DOCUMENTS

| | | |
|---|---|---|
| 206330 | 12/1986 | European Pat. Off. . |
| 212016 | 3/1987 | European Pat. Off. . |
| 2226938 | 7/1990 | United Kingdom . |

*Primary Examiner*—Raymond J. Bayerl
*Assistant Examiner*—Crescelle N. dela Torre
*Attorney, Agent, or Firm*—Keith Stephens

[57] ABSTRACT

An object-oriented window manager provides coordination between window displays generated by separate application programs by computing and storing the visible area of each application window each time displayed windows are changed. Each application program directly communicates with the screen buffer memory in order to redraw portions of the screen corresponding to its display area using the visible area computed by the window manager. Each application program communicates with the object-oriented window manager by creating a window object which provides flexible display capabilities that are transparent to the application program. Several techniques are used to decrease the visible area computation time. First, as mentioned above a copy of the visible area is stored or "cached" in each window object. This copy can be used if the application program needs to redraw the window area and the visible area has not been changed. In addition, the window manager computes the visible area of each application window utilizing a routine that assumes that only a single window has been changed and compares the new visible area of the window to the old visible area to obtain the change area. This change area is then used to recompute the visible area of all windows which lie behind the changed window.

12 Claims, 17 Drawing Sheets

OBJECT-ORIENTED WINDOW AREA DISPLAY SYSTEM

COPYRIGHT NOTIFICATION

Portions of this patent application contain materials that are subject to copyright protection. The copyright owner has no objection to the facsimile reproduction by anyone of the patent document, or the patent disclosure, as it appears in the Patent and Trademark Office.

FIELD OF THE INVENTION

This invention generally relates to improvements in computer systems and, more particularly, to operating system software for managing window display areas in a graphic user interface.

BACKGROUND OF THE INVENTION

One of the most important aspects of a modern computing system is the interface between the human user and the machine. The earliest and most popular type of interface was text based; a user communicated with the machine by typing text characters on a keyboard and the machine communicated with the user by displaying text characters on a display screen. More recently, graphic user interfaces have become popular where the machine communicates with a user by displaying graphics, including text and pictures, on a display screen and the user communicates with the machine both by typing in textual commands and by manipulating the displayed pictures with a pointing device, such as a mouse.

Many modern computer systems operate with a graphic user interface called a window environment. In a typical window environment, the graphical display portrayed on the display screen is arranged to resemble the surface of an electronic "desktop" and each application program running on the computer is represented as one or more electronic "paper sheets" displayed in rectangular regions of the screen called "windows".

Each window region generally displays information which is generated by the associated application program and there may be several window regions simultaneously present on the desktop, each representing information generated by a different application program. An application program presents information to the user through each window by drawing or "painting" images, graphics or text within the window region. The user, in turn, communicates with the application by "pointing at" objects in the window region with a cursor which is controlled by a pointing device and manipulating or moving the objects and also by typing information into the keyboard. The window regions may also be moved around on the display screen and changed in size and appearance so that the user can arrange the desktop in a convenient manner.

Each of the window regions also typically includes a number of standard graphical objects such as sizing boxes, buttons and scroll bars. These features represent user interface devices that the user can point at with the cursor to select and manipulate. When the devices are selected or manipulated, the underlying application program is informed, via the window system, that the control has been manipulated by the user.

In general, the window environment described above is part of the computer operating system. The operating system also typically includes a collection of utility programs that enable the computer system to perform basic operations, such as storing and retrieving information on a disc memory and performing file operations including the creation, naming and renaming of files and, in some cases, performing diagnostic operations in order to discover or recover from malfunctions.

The last part of the computing system is the "application program" which interacts with the operating system to provide much higher level functionality, perform a specific task and provide a direct interface with the user. The application program typically makes use of operating system functions by sending out series of task commands to the operating system which then performs a requested task, for example, the application program may request that the operating system store particular information on the computer disc memory or display information on the video display.

FIG. 1 is a schematic illustration of a typical prior art computer system utilizing both an application program and an operating system. The computer system is schematically represented by dotted box 100, the application is represented by box 102 and the operating system by box 106. The previously-described interaction between the application program 102 and the operating system 106 is illustrated schematically by arrow 104. This dual program system is used on many types of computer systems ranging from main frames to personal computers.

The method for handling screen displays varies from computer to computer and, in this regard, FIG. 1 represents a prior art personal computer system. In order to provide screen displays, application program 102 generally stores information to be displayed (the storing operation is shown schematically by arrow 108) into a screen buffer 110. Under control of various hardware and software in the system the contents of the screen buffer 110 are read out of the buffer and provided, as indicated schematically by arrow 114, to a display adapter 112. The display adapter 112 contains hardware and software (sometimes in the form of firmware) which converts the information in screen buffer 110 to a form which can be used to drive the display monitor 118 which is connected to display adapter 112 by cable 116.

The prior art configuration shown in FIG. 1 generally works well in a system where a single application program 102 is running at any given time. This simple system works properly because the single application program 102 can write information into any area of the entire screen buffer area 110 without causing a display problem. However, if the configuration shown in FIG. 1 is used in a computer system where more than one application program 102 can be operational at the same time (for example, a "multi-tasking" computer system) display problems can arise. More particularly, if each application program has access to the entire screen buffer 110, in the absence of some direct communication between applications, one application may overwrite a portion of the screen buffer which is being used by another application, thereby causing the display generated by one application to be overwritten by the display generated by the other application.

Accordingly, mechanisms were developed to coordinate the operation of the application programs to ensure that each application program was confined to only a portion of the screen buffer thereby separating the other displays. This coordination became complicated in systems where windows were allowed to "overlap" on the screen display. When the screen display is arranged so that windows appear to "overlap", a window which appears on the screen in "front"

of another window covers and obscures part of the underlying window. Thus, except for the foremost window, only part of the underlying windows may be drawn on the screen and be "visible" at any given time. Further, because the windows can be moved or resized by the user, the portion of each window which is visible changes as other windows are moved or resized. Thus, the portion of the screen buffer which is assigned to each application window also changes as windows from other applications are moved or resized.

In order to efficiently manage the changes to the screen buffer necessary to accommodate rapid screen changes caused by moving or resizing windows, the prior art computer arrangement shown in FIG. 1 was modified as shown in FIG. 2. In this new arrangement computer system 200 is controlled by one or more application programs, of which programs 202 and 216 are shown, which programs may be running simultaneously in the computer system. Each of the programs interfaces with the operating system 204 as illustrated schematically by arrows 206 and 220. However, in order to display information on the display screen, application programs 202 and 216 send display information to a central window manager program 218 located in the operating system 204. The window manager program 218, in turn, interfaces directly with the screen buffer 210 as illustrated schematically by arrow 208. The contents of screen buffer 210 are provided, as indicated by arrow 212, to a display adapter 214 which is connected by a cable 222 to a display monitor 224.

In such a system, the window manager 218 is generally responsible for maintaining all of the window displays that the user views during operation of the application programs. Since the window manager 218 is in communication with all application programs, it can coordinate between applications to insure that window displays do not overlap. Consequently, it is generally the task of the window manager to keep track of the location and size of the window and the window areas which must be drawn and redrawn as windows are moved.

The window manager 218 receives display requests from each of the applications 202 and 216. However, since only the window manager 218 interfaces with the screen buffer 210, it can allocate respective areas of the screen buffer 210 for each application and insure that no application erroneously overwrites the display generated by another application. There are a number of different window environments commercially available which utilize the arrangement illustrated in FIG. 2. These include the X/Window Operating environment, the WINDOWS, graphical user interface developed by the Microsoft Corporation and the OS/2 Presentation Manager, developed by the International Business Machines Corporation.

Each of these window environments has its own internal software architecture, but the architectures can all be classified by using a multi-layer model similar to the multi-layer models used to described computer network software. A typical multi-layer model includes the following layers:

User Interface

Window Manager

Resource Control and Communication

Component Driver Software

Computer Hardware where the term "window environment" refers to all of the above layers taken together.

The lowest or computer hardware level includes the basic computer and associated input and output devices including display monitors, keyboards, pointing devices, such as mice or trackballs, and other standard components, including printers and disc drives. The next or "component driver software" level consists of device-dependent software that generates the commands and signals necessary to operate the various hardware components. The resource control and communication layer interfaces with the component drivers and includes software routines which allocate resources, communicate between applications and multiplex communications generated by the higher layers to the underlying layers. The window manager handles the user interface to basic window operations, such as moving and resizing windows, activating or inactivating windows and redrawing and repainting windows. The final user interface layer provides high level facilities that implement the various controls (buttons, sliders, boxes and other controls) that application programs use to develop a complete user interface.

Although the arrangement shown in FIG. 2 solves the display screen interference problem, it suffers from the drawback that the window manager 218 must process the screen display requests generated by all of the application programs. Since the requests can only be processed serially, the requests are queued for presentation to the window manager before each request is processed to generate a display on terminal 224. In a display where many windows are present simultaneously on the screen, the window manager 218 can easily become a "bottleneck" for display information and prevent rapid changes by of the display by the application programs 202 and 216. A delay in the redrawing of the screen when windows are moved or repositioned by the user often manifests itself by the appearance that the windows are being constructed in a piecemeal fashion which becomes annoying and detracts from the operation of the system.

Accordingly, it is an object of the present invention to provide a window manager which can interface with application programs in such a manner that the screen display generated by each application program can be quickly and effectively redrawn.

It is another object of the present invention to provide a window manager which coordinates the display generation for all of the application programs in order to prevent the applications from interfering with each other or overwriting each other on the screen display.

It is yet another object of the present invention to provide a window manager which can interact with the application programs by means of a simple command structure without the application programs being concerned with actual implementation details.

It is yet another object of the present invention to provide a window manager which allows application program developers who need detailed control over the screen display process to achieve this control by means of a full set of display control commands which are available, but need not be used by each application program.

SUMMARY OF THE INVENTION

The foregoing problems are overcome and the foregoing objects are achieved in an illustrative embodiment of the invention in which an object-oriented window manager provides coordination between separate application programs by computing and storing the visible area of each application window each time displayed windows are changed. Each application program directly communicates with the screen buffer memory in order to redraw portions of the screen corresponding to its display area using the visible area computed by the window manager.

Each application program communicates with the object-oriented window manager by creating a window object which provides flexible display capabilities that are transparent to the application program. The window object includes commands for directly interfacing with the window manager and a data area for temporarily storing the associated visible area computed by the window manager.

Several techniques are used to decrease the visible area computation time. First, as mentioned above a copy of the visible area is stored or "cached" in each window object. This copy can be used if the application program needs to redraw the window area and the visible area has not been changed. In addition, the window manager computes the visible area of each application window utilizing one of two routines that allow it to rapidly compute the visible area. One of the routines assumes that only a single window has been changed and compares the new visible area of the window to the old visible area to obtain the changed area. This change area is then used to recompute the visible area of all windows which lie behind the changed window. The other recomputation routine recomputes all of the visible areas and can be used if a window is removed, for example.

BRIEF DESCRIPTION OF THE DRAWINGS

The above and further advantages of the invention may be better understood by referring to the following description in conjunction with the accompanying drawings, in which.

DETAILED DESCRIPTION OF A PREFERRED EMBODIMENT OF THE INVENTION

Figure 1:
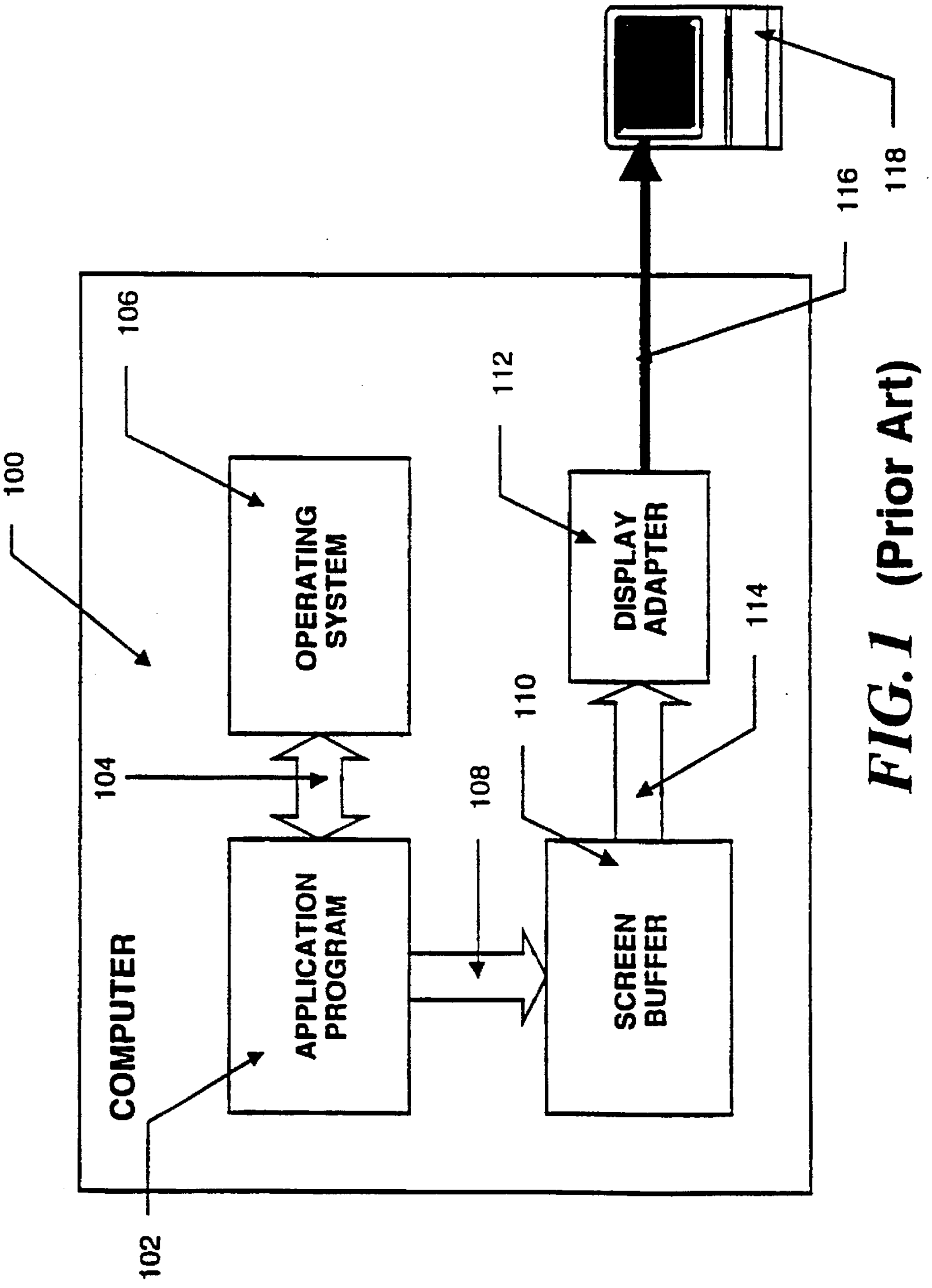
FIG. 1 (Prior Art)
FIG. 1 is a schematic block diagram of a prior art computer system showing the relationship of the application program, the operating system, the screen buffer and, the display monitor.
Figure 2:
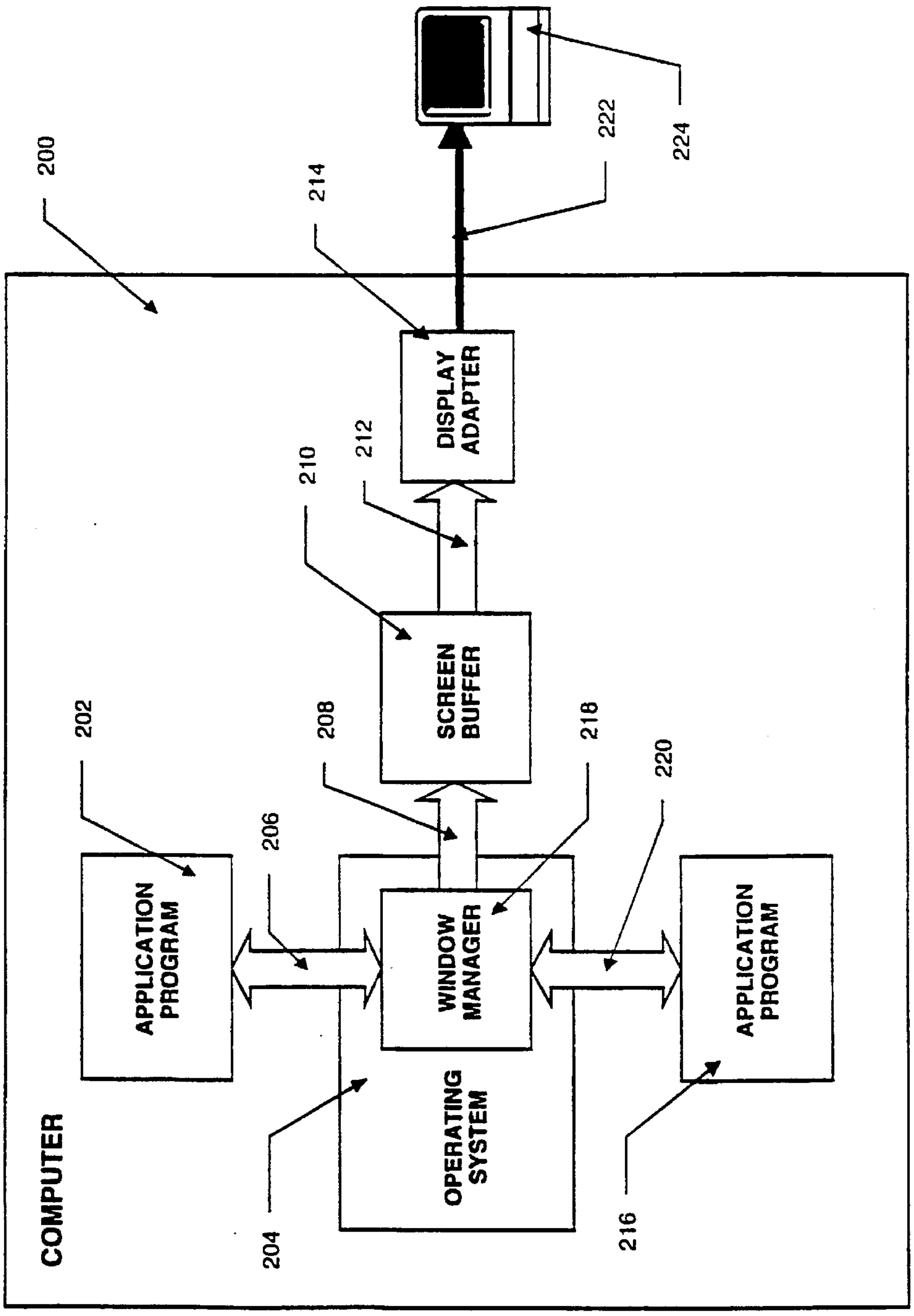
FIG. 2 (Prior Art)
FIG. 2 is a schematic block diagram of a modification of the prior art system shown in FIG. 1 which allows several application programs running simultaneously to generate screen displays.
Figure 3:
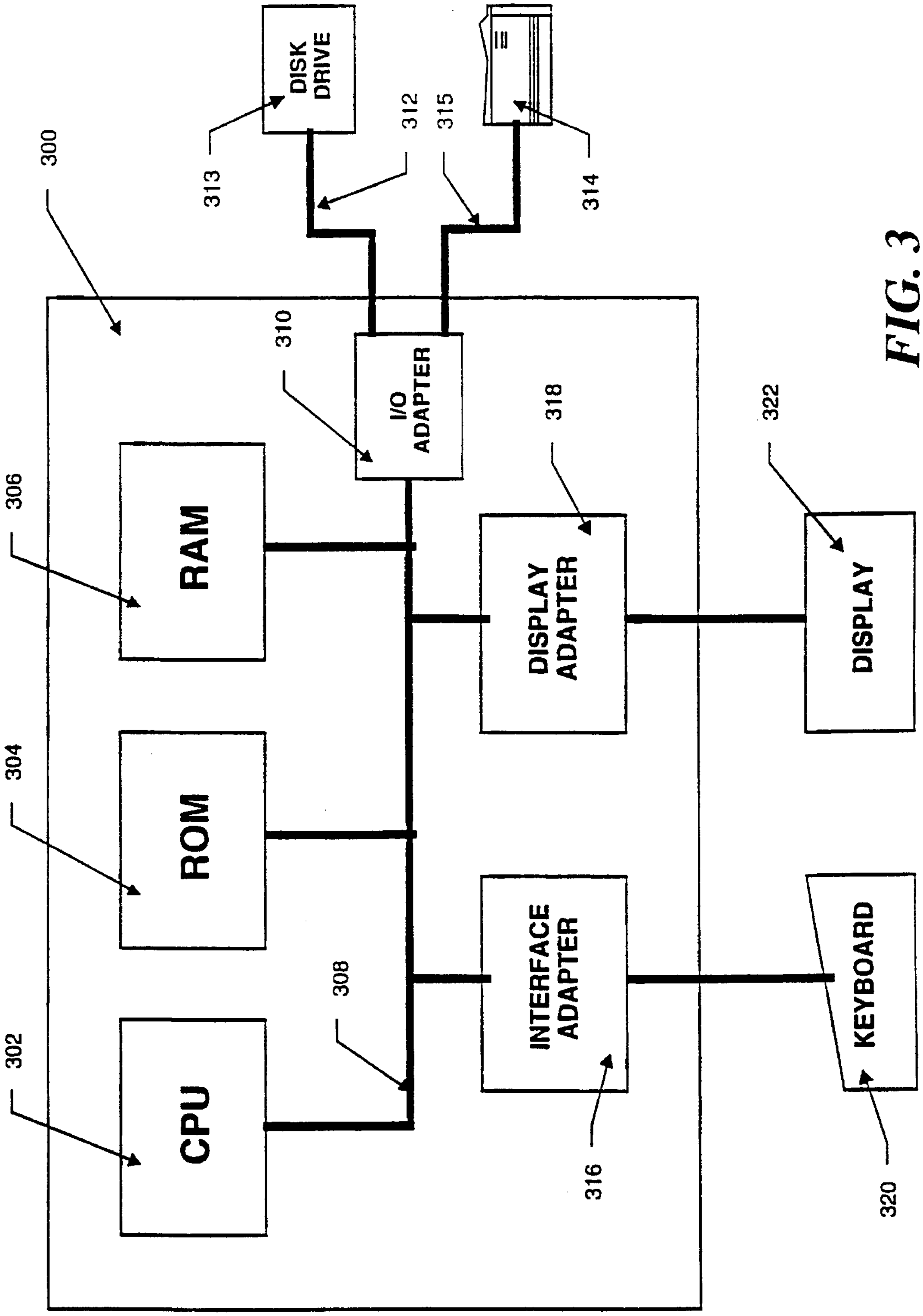
FIG. 3 is a block schematic diagram of a computer system for example, a personal computer system on which the inventive object oriented window manager operates.

The invention is preferably practiced in the context of an operating system resident on a personal computer such as the IBM, PS/2, or Apple, Macintosh, computer. A representative hardware environment is depicted in FIG. 3, which illustrates a typical hardware configuration of a computer 300 in accordance with the subject invention. The computer 300 is controlled by a central processing unit 302 (which may be a conventional microprocessor) and a number of other units, all interconnected via a system bus 308, are provided to accomplish specific tasks. Although a particular computer may only have some of the units illustrated in FIG. 3, or may have additional components not shown, most computers will include at least the units shown.

Specifically, computer 300 shown in FIG. 3 includes a random access memory (RAM) 306 for temporary storage of information, a read only memory (ROM) 304 for permanent storage of the computer's configuration and basic operating commands and an input/output (I/O) adapter 310 for connecting peripheral devices such as a disk unit 313 and printer 314 to the bus 308, via cables 315 and 312, respectively. A user interface adapter 316 is also provided for connecting input devices, such as a keyboard 320, and other known interface devices including mice, speakers and microphones to the bus 308. Visual output is provided by a display adapter 318 which connects the bus 308 to a display device 322, such as a video monitor. The workstation has resident thereon and is controlled and coordinated by operating system software such as the Apple System/7, operating system.

In a preferred embodiment, the invention is implemented in the C++ programming language using object-oriented programming techniques. C++ is a compiled language, that is, programs are written in a human-readable script and this script is then provided to another program called a compiler which generates a machine-readable numeric code that can be loaded into, and directly executed by, a computer. As described below, the C++ language has certain characteristics which allow a software developer to easily use programs written by others while still providing a great deal of control over the reuse of programs to prevent their destruction or improper use. The C++ language is well-known and many articles and texts are available which describe the language in detail. In addition, C++ compilers are commercially available from several vendors including Borland International, Inc. and Microsoft Corporation. Accordingly, for reasons of clarity, the details of the C++ language and the operation of the C++ compiler will not be discussed further in detail herein.

As will be understood by those skilled in the art, Object-Oriented Programming (OOP) techniques involve the definition, creation, use and destruction of "objects". These objects are software entities comprising data elements and routines, or functions, which manipulate the data elements. The data and related functions are treated by the software as an entity and can be created, used and deleted as if they were a single item. Together, the data and functions enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not objects themselves, but which act as templates that instruct the compiler how to construct the actual object. A class may, for example, specify the number and type of data variables and the steps involved in the functions which manipulate the data. An object is actually created in the program by means of a special function called a constructor which uses the corresponding class definition and additional information, such as arguments provided during object creation, to construct the object. Likewise objects are destroyed by a special function called a destructor. Objects may be used by using their data and invoking their functions.

The principle benefits of object-oriented programming techniques arise out of three basic principles; encapsulation, polymorphism and inheritance. More specifically, objects can be designed to hide, or encapsulate, all, or a portion of, the internal data structure and the internal functions. More particularly, during program design, a program developer can define objects in which all or some of the data variables and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common format (A+B) and, during compilation, the C++ compiler will determine which of the three functions is actually being used by examining the variable types. The compiler will then substitute the proper function code. Polymorphism allows similar functions which produce analogous results to be "grouped" in the program source code to produce a more logical and clear program flow.

The third principle which underlies object-oriented programming is inheritance, which allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these function appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

Although object-oriented programming offers significant improvements over other programming concepts, program development still requires significant outlays of time and effort, especially if no pre-existing software programs are available for modification. Consequently, a prior art approach has been to provide a program developer with a set of pre-defined, interconnected classes which create a set of objects and additional miscellaneous routines that are all directed to performing commonly-encountered tasks in a particular environment. Such pre-defined classes and libraries are typically called "frameworks" and essentially provide a pre-fabricated structure for a working application.

For example, an framework for a user interface might provide a set of pre-defined graphic interface objects which create windows, scroll bars, menus, etc. and provide the support and "default" behavior for these graphic interface objects. Since frameworks are based on object-oriented techniques, the pre-defined classes can be used as base classes and the built-in default behavior can be inherited by developer-defined subclasses and either modified or overridden to allow developers to extend the framework and create customized solutions in a particular area of expertise. This object-oriented approach provides a major advantage over traditional programming since the programmer is not changing the original program, but rather extending the capabilities of the original program. In addition, developers are not blindly working through layers of code because the framework provides architectural guidance and modeling and, at the same time, frees the developers to supply specific actions unique to the problem domain.

There are many kinds of frameworks available, depending on the level of the system involved and the kind of problem to be solved. The types of frameworks range from high-level application frameworks that assist in developing a user interface, to lower-level frameworks that provide basic system software services such as communications, printing, file systems support, graphics, etc. Commercial examples of application frameworks include MacApp (Apple), Bedrock (Symantec), OWL (Borland), NeXT Step App Kit (NeXT), and Smalltalk-80 MVC (ParcPlace).

While the framework approach utilizes all the principles of encapsulation, polymorphism, and inheritance in the object layer, and is a substantial improvement over other programming techniques, there are difficulties which arise.

Application frameworks generally consist of one or more object "layers" on top of a monolithic operating system and even with the flexibility of the object layer, it is still often necessary to directly interact with the underlying operating system by means of awkward procedural calls.

In the same way that an application framework provides the developer with prefab functionality for an application program, a system framework, such as that included in a preferred embodiment, can provide a prefab functionality for system level services which developers can modify or override to create customized solutions, thereby avoiding the awkward procedural calls necessary with the prior art application frameworks programs. For example, consider a display framework which could provide the foundation for creating, deleting and manipulating windows to display information generated by an application program. An application software developer who needed these capabilities would ordinarily have to write specific routines to provide them. To do this with a framework, the developer only needs to supply the characteristics and behavior of the finished display, while the framework provides the actual routines which perform the tasks.

A preferred embodiment takes the concept of frameworks and applies it throughout the entire system, including the application and the operating system. For the commercial or corporate developer, systems integrator, or OEM, this means all of the advantages that have been illustrated for a framework such as MacApp can be leveraged not only at the application level for such things as text and user interfaces, but also at the system level, for services such as printing, graphics, multi-media, file systems, I/O, testing, etc.

Figure 4:
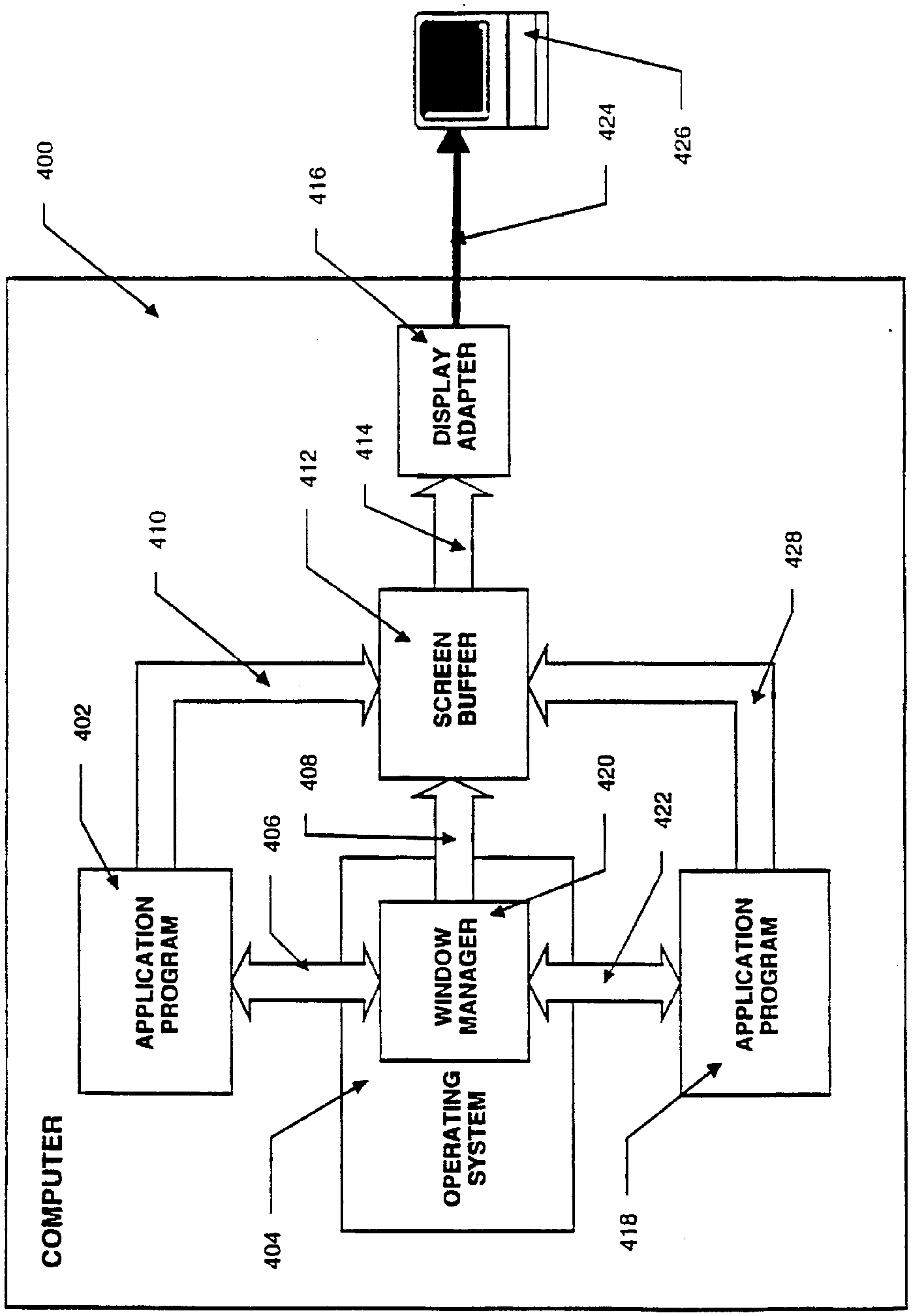
FIG. 4 is a schematic block diagram of a modified computer system showing the interaction between a plurality of application programs and the window manager in screen buffer in order to display graphic information on the display monitor.

FIG. 4 shows a schematic overview of a computer system utilizing the object-oriented window manager of the present invention. The computer system is shown generally as dotted box 400 and several application programs (of which application programs 402 and 418 are shown) and an operating system 404 are provided to control and coordinate the operations of the computer. In order to simplify FIG. 4, the interaction of the application programs 402 and 418 with the operating system 404 is limited to the interactions dealing with the screen displays. As shown in the figure, both application programs 402 and 418 interface with the window manager portion 420 of the operating system 404. The window manager 420, in turn, sends information to the screen buffer 412 as schematically illustrated by arrow 408.

However, in accordance with the invention, and, as shown in FIG. 4, application programs 402 and 418 also directly send information to the screen buffer 412 as illustrated by arrows 410 and 428. As will hereinafter be explained in detail, application programs 402 and 418 provide display information directly to the window 420 and retrieve stored information from window manager 420 when a window display is changed. More specifically, when a window is changed, window manager 420 recomputes and stores the visible area of each window. This stored visible area is retrieved by the respective application program and used as a clipping region into which the application draws the display information. Repainting or drawing of the windows is performed simultaneously by the application programs in order to increase the screen repainting speed.

The application displays are kept separated on the display screen because the window manager 420 recomputes the window visible areas so that none of the areas overlap. Thus, if each application program, such as application program 402 or application program 418 draws only in the visible area provided to it by the window manager 420, there will be no overlap in the displays produced by the screen buffer. Once the display information is drawn into the screen buffer 412 it is provided, as indicated by arrow 414, to a display adapter 416 which is, in turn, connected by cable, or bus, 424 to the display monitor 426.

Figure 5:
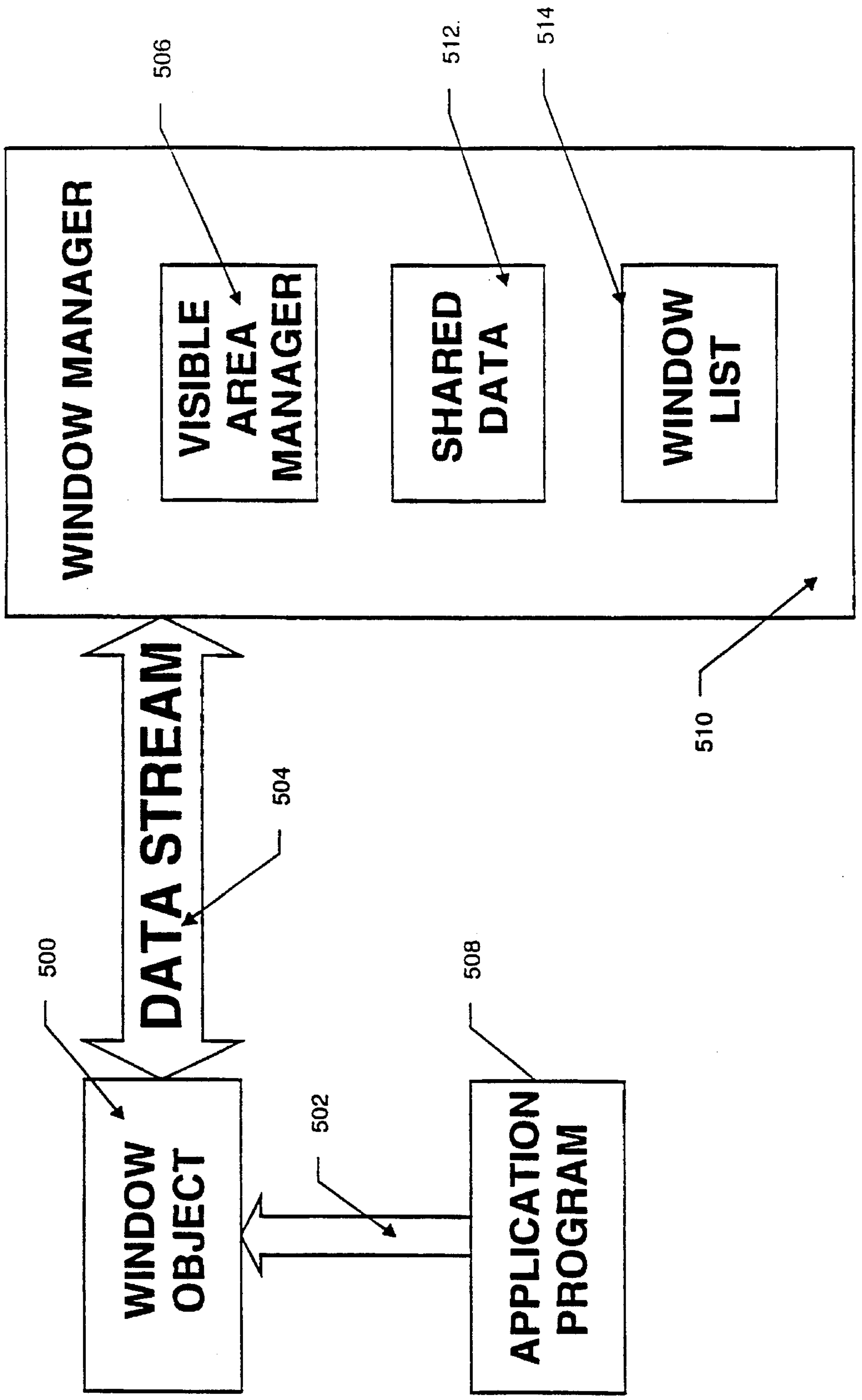
FIG. 5 is a block schematic diagram of the information paths which indicate the manner in which an application program communicates with the inventive object oriented manager.

The interaction of an application program with the window manager is illustrated in more detail in schematic diagram FIG. 5. As previously mentioned, the window manager (illustrated as box 510 in FIG. 5) is an object-oriented program. Accordingly, an application program 508 interfaces with the window manager by creating and manipulating "objects". In particular, each application program creates a window object, for example, window object 500 in order to communicate with window manager 510. The application program 508 then communicates with the window object 500 as shown schematically by arrow 502. The window manager itself is an object which is created when the operating system is started and creation of a window object causes the window manager 510 to create an associated window on the display screen.

As will hereinafter be described in more detail, each window object 500 includes a small data store or "cache" area (not shown) which is used to store the associated window visible area. When the application program desires to redraw the information in one of its associated windows, the window object first checks cache status. If the information stored in the cache area has not been changed, then this information is used to redraw the window. The use of the cache area obviates the necessity of retrieving the visible area from the window manager 510 and reduces the time necessary to complete a redrawing operation.

Since many window objects may be created simultaneously in order to simultaneously display many windows on the display screen, each window object 500 communicates with the window manager 510 by means of a data stream 504. Data stream 504 is created by creating "stream" objects which contain the software commands necessary to transfer information from one object to another. For example, when window object 500 desires to transfer information to window manager object 510, window object 500 creates a stream object which "streams" the data into window manager object 510. Similarly, when window manager object 510 desires to transfer information back to window object 500, window manager object 510 creates a stream object which "streams" the data into window object 500. Such stream objects are conventional in nature and not described in detail herein. The stream objects which carry data from window object 500 to window manager object 510 and the stream objects which carry information from window manager object 510 to window object 500 are illustrated collectively as arrow 504.

As shown in FIG. 5, window manager object 510 consists of three main parts: the visible area manager 506, the shared data area 512 and the window list 514. The visible area manager 506 is an independent task which is started by the window manager 510 when the window manager 510 is created. As will be hereinafter explained in detail, the visible area manager is responsible for managing the portions of the window which are visible on the data display screen. To this end, it recomputes a window's visible area when either a window, or another window located in "front" of the window is changed. It also performs a number of other housekeeping tasks, such as the repair of desktop "damage" which occurs when windows are reoriented or resized and expose previously-covered areas of the underlying "desktop".

The shared data area 512 comprises an area in shared memory and associated storage and retrieval routines which together store information related to the windows. The shared data area is created by the window manager in shared memory and a portion of the shared data area is assigned to each of the windows and contains various window parameters including a "time stamp" indicating the version of the visible area.

As previously mentioned, in order to reduce the use of a message stream to access the visible area, each window object 500 also maintains a local "cache" memory which stores a copy of the visible area of the associated window. A time stamp is also stored in the local cache memory, which time stamp indicates the last version of the visible area that was retrieved from the window server. When an application program begins a redrawing operation, it requests the visible area from the window object. The window object, in turn, retrieves a time stamp from the shared memory area and compares the retrieved time stamp to the time stamp stored in the local cache memory. If the comparison of the two time stamps indicates that the visible area was not modified, then the copy of the visible area stored in the local cache memory is used for the redrawing operation. Alternatively, if the time stamp comparison indicates that the window manager has updated the visible area, then a new visible area must be retrieved and stored in the local cache area. The retrieval of the time stamp alone is much faster than the retrieval of the entire visible area so that the overall redrawing time is reduced if the local cached copy can be used.

Window manager 510 also maintains a window list 514 which is illustratively implemented as a linked list that contains an identification number for each window currently in the system. In accordance with a preferred embodiment of the invention, each window is assigned a window "kind". Window kinds are selected from a kind hierarchy which generally follows the relative positioning of the windows on the screen. An illustrative kind hierarchy is as follows (window kinds are illustrated starting with the window kind which normally appears in the foremost window position):

| | |
|---|---|
| Foremost Position | screen saver |
| | menu bar |
| | menu |
| | windoid (intended for floating palettes and other similar type of window) |
| | document |
| Rearmost Position | desktop |

The window manager automatically maintains the windows displayed on the screen in a manner such that windows of a similar kind are all positioned together in a kind "layer". This positioning is accomplished by inserting "place holders" in the window list indicating divisions between kind layers. The window manager can then iterate through the window list until it reaches one of these place holders to determine when the end of a particular kind layer has been reached in the start of a new kind layer begins.

As previously mentioned, in accordance with a preferred embodiment, the operating system is capable of running multiple tasks simultaneously and, whenever two or more tasks are operating simultaneously, there is a potential for mutual interaction. Such mutual interaction can occur when two or more tasks attempt to access simultaneously shared resources, such as the shared data area or the window list. Accordingly, concurrency controls are necessary to manage such interactions and to prevent unwanted interference. An illustrative concurrency control technique known as a semaphore is used in one embodiment. Semaphores are well-known devices which are used to "serialize" concurrent access attempts to a resource. In particular, before a task can access a resource which is controlled by a semaphore, the task must "acquire" the semaphore. When the task is finished with the resource it releases the semaphore for acquisition by another task. Each semaphore generally has a request queue associated with it so that requests to acquire the semaphore which cannot be honored (because the semaphore has been acquired by another task) are held on the queue.

In the present system, semaphores are used to protect several different shared resources. In particular, a global drawing semaphore is used to prevent the application programs from interacting with the window manager. Before accessing the visible area, each application program must acquire the drawing semaphore. The drawing semaphore used in the present system has two modes: a shared mode and an exclusive mode. In accordance with the invention, application programs may write in the screen buffer simultaneously with other application programs and therefore must acquire the drawing semaphore in the "shared" mode. Since the application programs are kept separate in the screen buffer by the window manager, this simultaneous access does not present a problem. However, the window manager performs operations, such as creating a new window, which can affect all windows and, thus, the window manager must acquire the drawing semaphore in the "exclusive" mode. When the window manager has acquired the drawing semaphore exclusively, the applications cannot acquire the semaphore and thus cannot write in the screen buffer. This exclusive operation prevents the applications from overwriting changed portions of the screen buffer before they have been informed of the changes.

In a similar manner, global semaphores are used to protect the shared data area 512 in the window manager 510 which shared area is also a shared resource. A similar local semaphore is used to protect the window list 514 from simultaneous access by different application programs using the window server. The specific acquisition and release of the various semaphores will be discussed in further detail herein when the actual routines used by the programs are discussed in detail.

Figure 6:
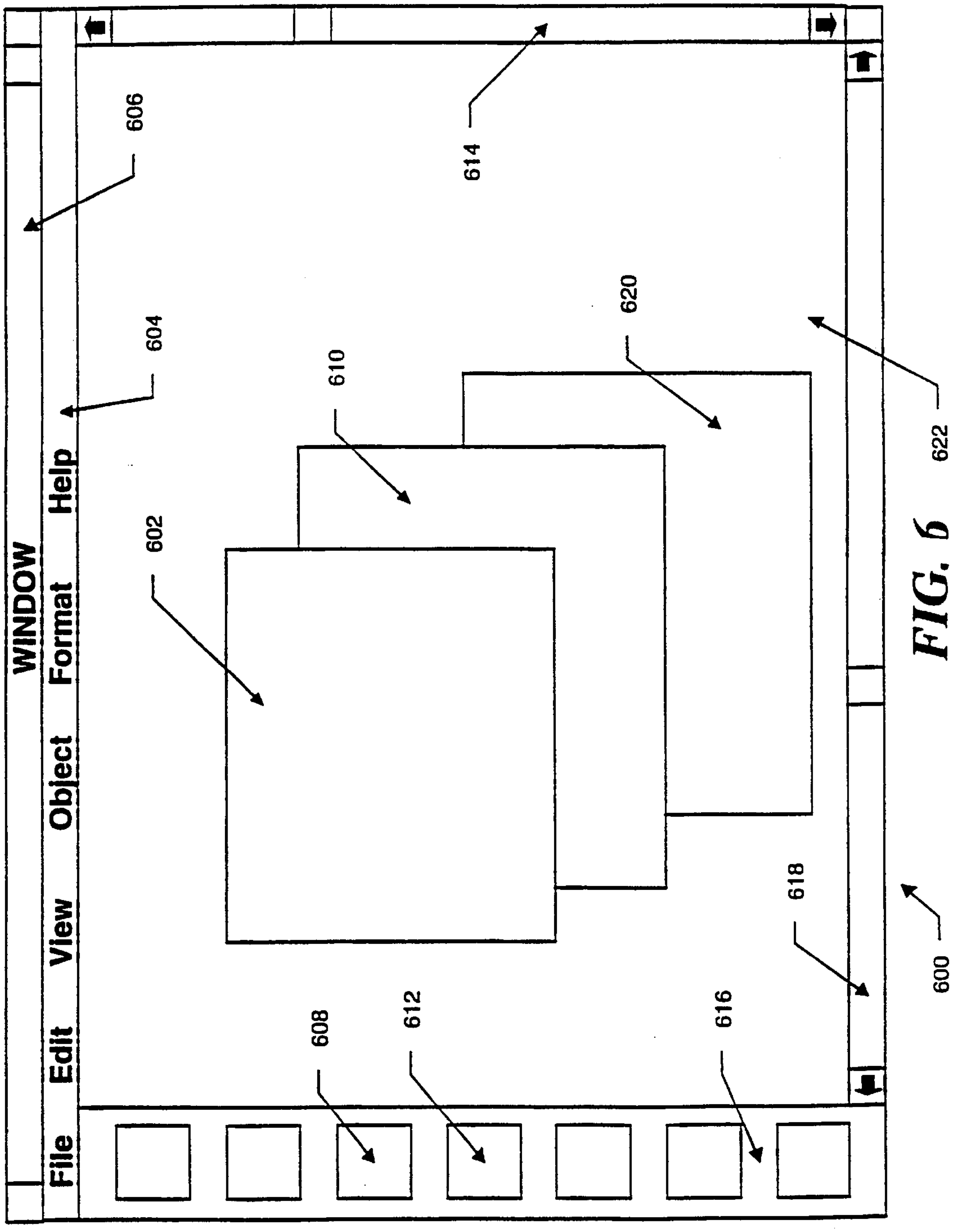
FIG. 6 is a schematic diagram indicating the typical appearance of a graphical user interface which supports a windows oriented display illustrating the components and parts of a window.

FIG. 6 shows an illustrative screen display generated by a typical "window environment" program. A window 600 is a rectangular area enclosed by borders which can be moved and resized in a conventional manner. The window 600 usually includes a title bar 606 and a menu bar 604, each of which may themselves comprise another window. The menu bar 604 allows access to a number of pull-down menus (not shown) that are operated in a well-known manner and allow the user to access various file, editing and other commands.

The area remaining within the window, after excluding the title bar 606, the menu bar 604 and the borders, is called the "client" area and constitutes the main area that can be drawn or painted by an application program such as a drawing program. A client area may enclose additional windows called "child" windows that are associated with the main window. In this case the main window is called a "parent" window in relation to the child windows. Each child window may also have one or more child windows associated with it for which it is a parent window and so on.

Many application programs further sub-divide the client area into a number of child windows which are independently controlled. These typically include a document window 622, a "toolbar" or "palette" window 616, and, in some cases, a status line window (not shown). The document window 622 may be equipped with horizontal and vertical scroll bars, 618 and 614, that allow objects in the document window to be moved on the screen. The document window 622 may be further sub-divided into child windows 602, 610 and 620 which may also overlap each other. At any given time usually only one of the child windows 602, 610 and 620 is active and only one window has input "focus". Only the window which has input focus responds to input actions and commands from the input devices such as the mouse and the keyboard. A window which responds to keyboard entries is also called a non-positional window because it responds to input other than repositioning and resizing commands.

The toolbar/palette window 616 usually contains a number of iconic images, such as icons 608 and 612, which are used as a convenient way to initiate certain, often-used programs or subroutines. For example, icon 608 may be selected to initiate a drawing routine which draws a box on the screen, whereas icon 612 might initiate a spelling checker program. The operation of such toolbars and palettes is generally well-known and will not be described further herein.

The displayed controls are generally selected by means of a mouse or other input device. The mouse controls a cursor that is drawn on the screen by the window program. When the cursor is positioned over the graphic image to be selected, a button is activated on the mouse causing the application program to respond.

Figure 7A:
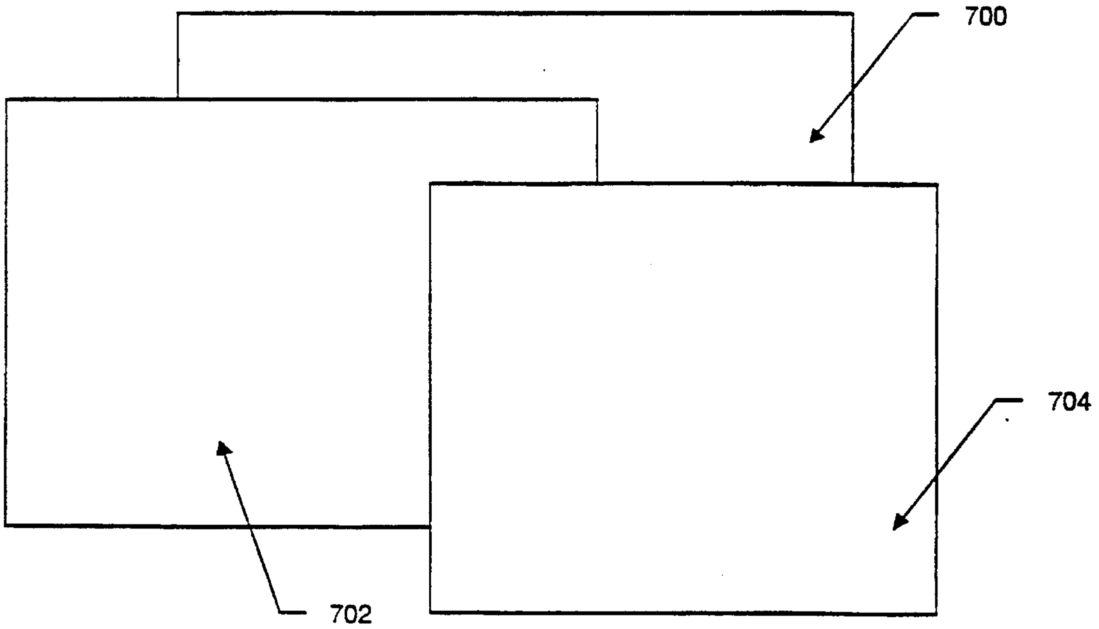
FIGS. 7A and 7B illustrate portions of the display screen which must be redrawn when an application window is resized.
Figure 7B:
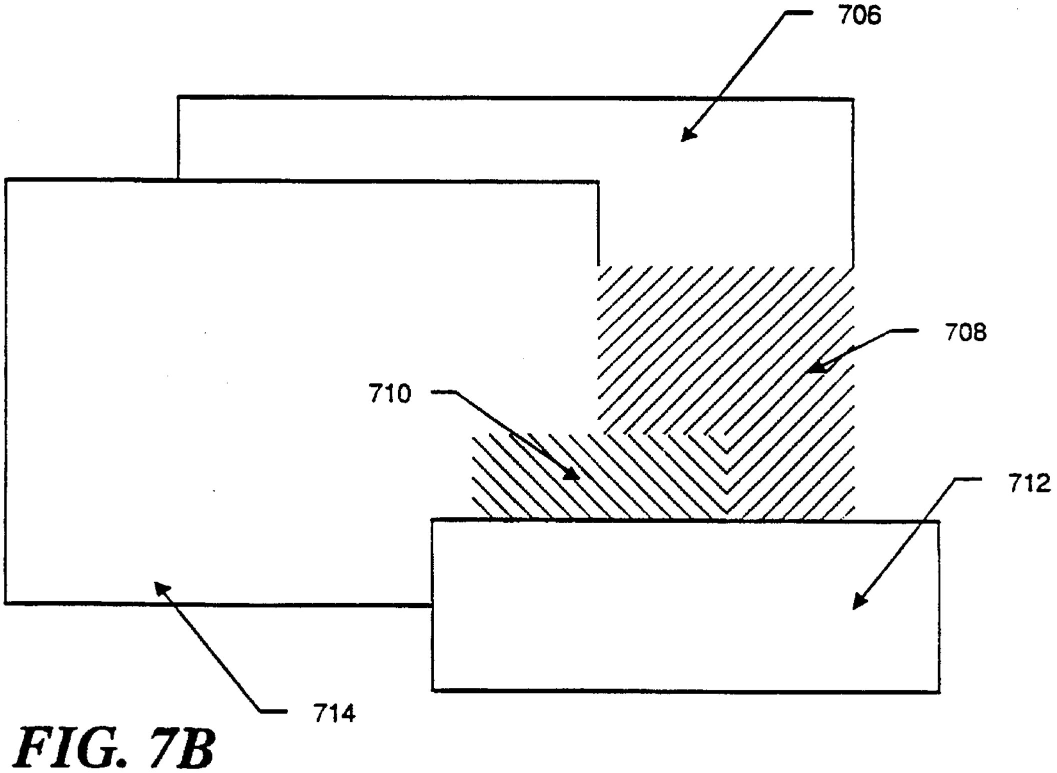

Although the controls discussed above generally cannot be moved or resized by the application program, the parent and child windows are usually totally under control of the application program. When an application program has several windows, or several application programs, which are running simultaneously, are displaying windows, changes in the size or the position of one window will change the displayed or visible areas of windows which are "under" the changed window. FIGS. 7A and 7B illustrate how a manipulation of one window associated with an application can change the visible areas of other windows that are associated with the same application and with other independent applications.

In particular, FIG. 7A shows three windows located on a background or desktop. The windows overlap—window 700 is in the background, window 702 is in front of window 700 and window 704 is in front of window 702. As shown in FIG. 7A, window 704 obscures portions of windows 702 and 700. Since each of windows 700, 702 and 704 can be independently moved and resized, it is possible when the foremost windows 702 or 704 are moved or resized, areas in the overlapped windows can be uncovered or covered and thereby change the visual appearance of these windows. However, due to the overlapped appearance of the windows, a change to a selected window only affects window behind the selected window. For example, a change to window 704 can affect windows 702 and 700, but a change to window 700 cannot affect windows 702 or 704 since these latter windows overlap and obscure portions of window 700.

FIG. 7B indicates the effect of a resizing of the front window 704 in FIG. 7A. In particular, FIG. 7B illustrates three windows 712, 714 and 706, which correspond to windows 704, 702 and 700 in FIG. 7A, respectively. However, in FIG. 7B, window 712 has been resized and, in particular, reduced in size from the original size window 704. The reduction in the size of window 712 exposes an area (illustrated as shaded area ) of window 710 that was previously totally covered by window 712. Similarly, the shaded portion 708 of window 706 is also uncovered. In accordance with normal window environment operation, only visible portions of windows are painted. Accordingly, areas 708 and 710 must be redrawn or repainted as they have now become visible areas. This redrawing is accomplished by a coordination between the window manager and the application program as previously described.

Specifically, the window manager computes the new visible area of each changed window and all windows that lie behind the changed window. The window manager then sends an "update tickle" to each application associated with a changed window indicating to the application that part of its visible area must be redrawn. Each application, in turn, causes the window object associated with the changed window to retrieve the time stamp associated with the changed visible area from the window server in the window manager.

The window object compares the retrieved time stamp to the time stamp stored in its local cache memory. Since the associated window visible area has been updated by the window manager, the time stamp comparison will indicate that the visible area cached in the window object is no longer valid. Accordingly, the window object will retrieve the new visible area from the shared data memory and proceed to update the visible area by directly writing into the screen buffer using the semaphore mechanism discussed above.

Figure 8:
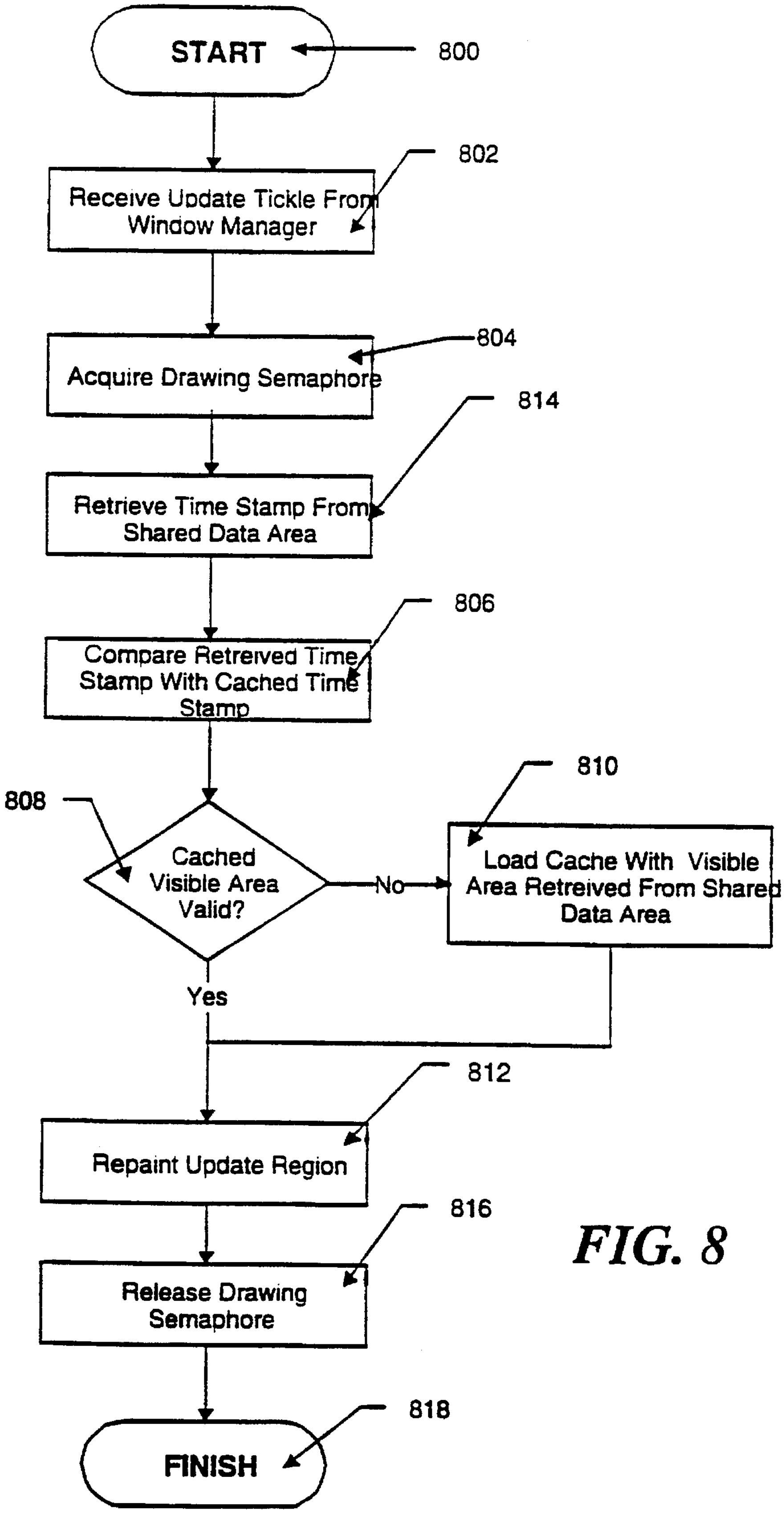
FIG. 8 is an illustrative flow chart of a method by which an application program interacts with the object oriented window manager in order to display information on the display screen.

The process of repainting a new visible area is shown in detail in the flowchart illustrated in FIG. 8. In particular, the repainting routine starts in step 800 and proceeds to step 802 where the window object associated with the window to be repainted receives an update tickle from the window manager. An update tickle might be generated when the window manager resizes a window as illustrated in FIGS. 7A and 7B. In response, the window object acquires the drawing semaphore in function block 804, retrieves from the shared data area the time stamp associated with the new visible region as illustrated in step 804. In step 806, this retrieved time stamp is compared to the time stamp already cached in the window object to determine if the cached visible area is valid. If the cached visible area is valid as determined in step 808, the routine proceeds to step 812. Alternatively, if the cached visible area is not valid the routine proceeds to step 810 where the window object cache is loaded with the new visible area from the window server.

As previously mentioned, before drawing in the screen buffer each application program must acquire the global drawing semaphore in the shared mode as indicated by step 804. The update region is repainted by the application by writing directly in the screen memory at function block 812. When the repainting is finished, the routine proceeds to step 816 in which the drawing semaphore is released and the routine then finishes in step 818.

Figure 9:
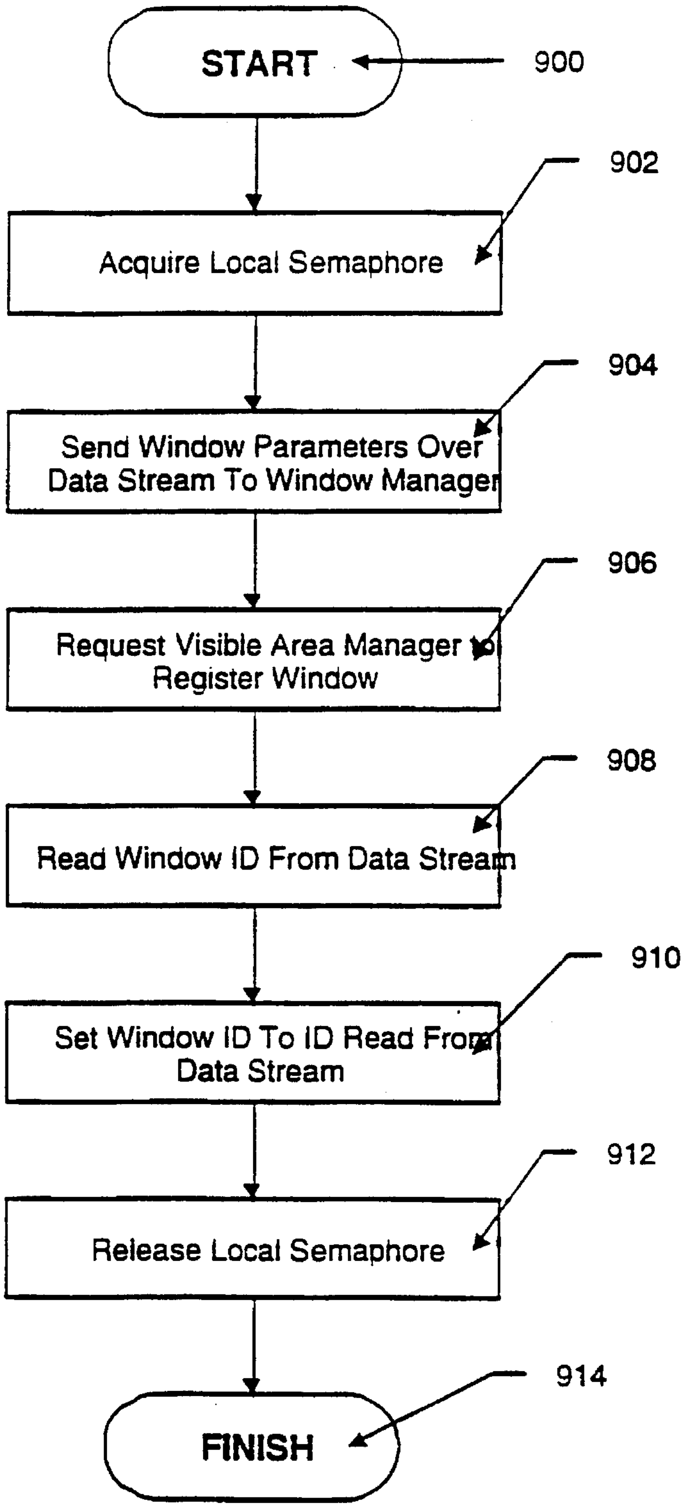
FIG. 9 is an illustrative flow chart of a method used by the application program to create a new window.

Also as previously mentioned, a window object can interact with the window manager to provide various window management functions, such as creating a new window. An illustrative routine used by the window object to create a new window is shown in detail in the flowchart of FIG. 9. The routine starts in step 900 and proceeds to step 902 in which a local semaphore is acquired by the window object. The local semaphore is necessary because the window object can be accessed by a number of applications and, accordingly, the semaphore is used to prevent undesired interaction between the window object and various applications.

After the local semaphore is acquired in step 902, the routine proceeds to step 904 in which the parameters defining the desired window are streamed over the data stream (illustrated as arrow 504 in FIG. 5) to the window manager.

In addition, a request is made to the visible area manager in the window manager to "register" the new window. This request causes the visible area manager to create a new window. Although the operations of the window manager in creating a new window will be discussed further in detail herein, in summary, the window manager adds the new window to the window list and creates a new window, in the process it generates a new window identification number (ID).

The ID generated by the window manager is streamed back as to the window object on the returning data stream as indicated in step 908, and in step 910, the window object sets the window ID in its cached data to the ID read from the data stream. The routine then proceeds to step 912 in which the local semaphore is released. The routine finishes in step 914.

Figure 10:
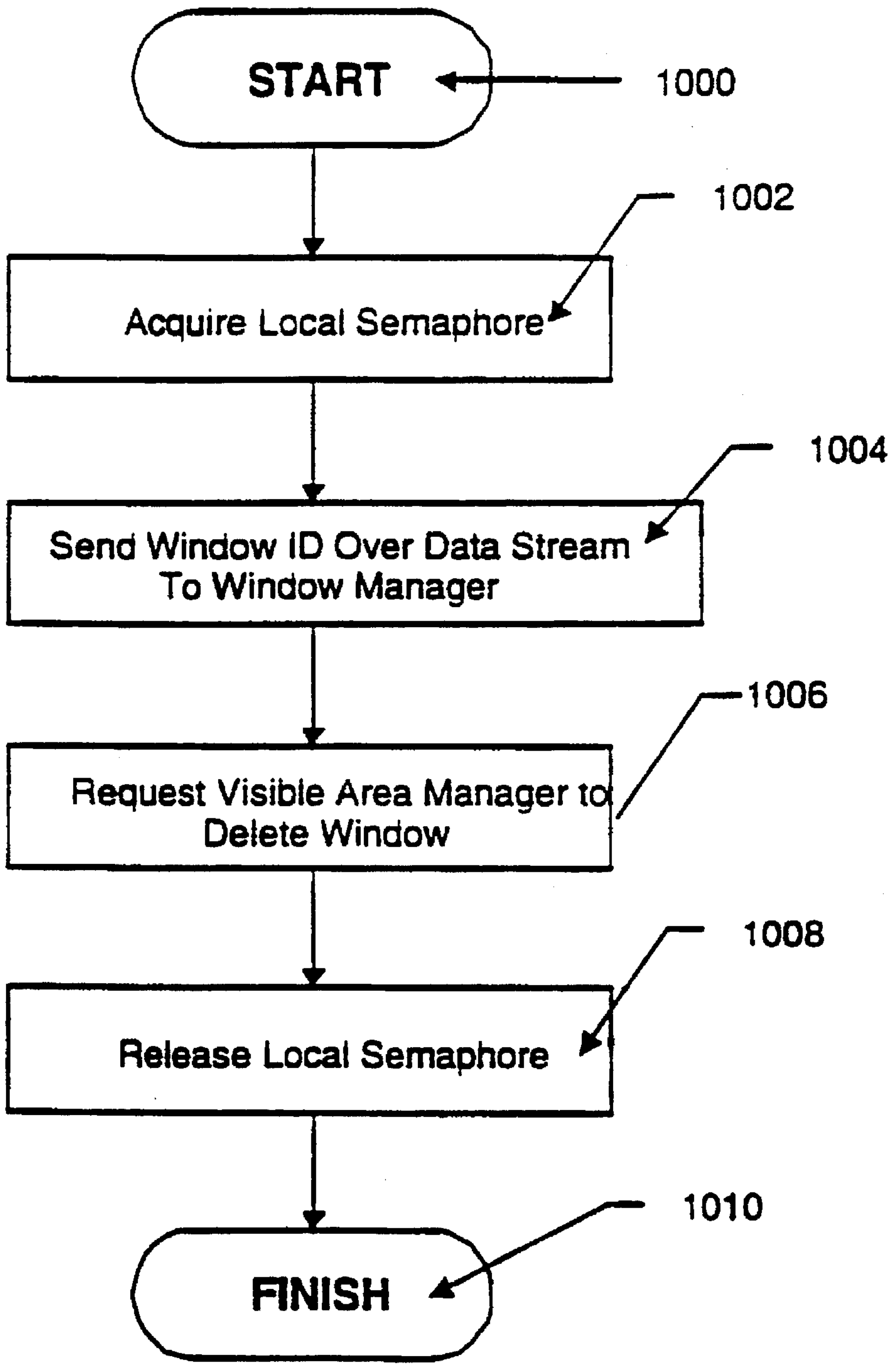
FIG. 10 is an illustrative flow chart of a method used to delete a existing window from the display.

A window object can also request that the window manager delete a selected window. The steps in this operation are shown in detail in FIG. 10. As shown in the illustrated flowchart, the window delete routine starts in step 1000 and proceeds to step 1002 in which a local semaphore is acquired. The routine then proceeds to step 1004 in which window ID of the window to be deleted is retrieved from local cache memory and streamed over the data stream to the window manager. A request is then made to the visible area manager (as indicated in step 1006) to delete the window. The local semaphore is then released in step 1008 and the routine finishes in step 1010.

Figure 11:
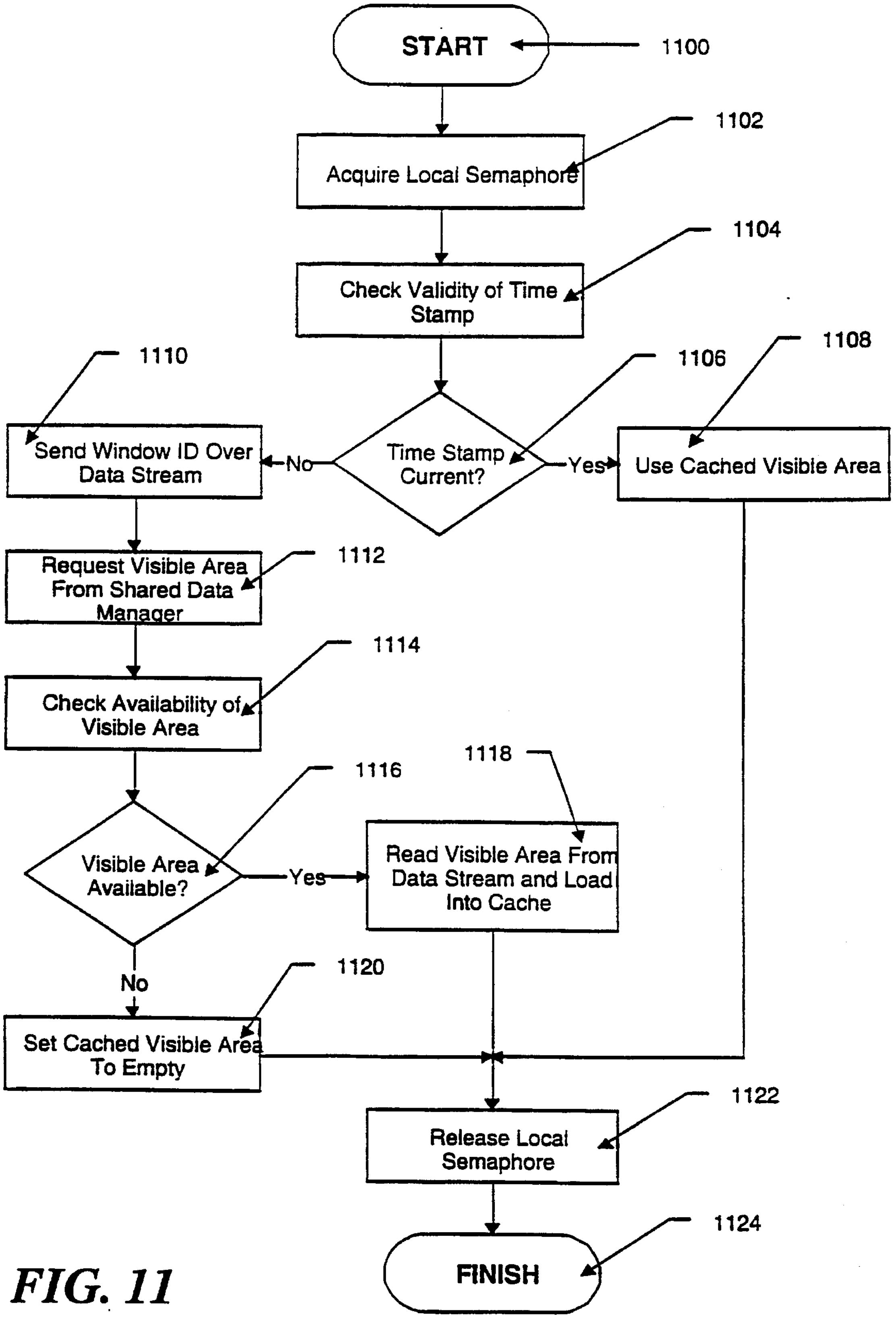
FIG. 11 is an illustrative flow chart of the method by which an application program requests the visible area information from the object oriented window manager.

As previously mentioned, before drawing in the screen buffer each window object checks to make sure that its cached visible area is valid by examining and comparing time stamps stored in the window object cache memory and retrieved from the shared data maintained by window manager. If the cached visible area is not valid, a new visible area is requested from the window manager shared data area. The steps involved in requesting a new visible area are shown in detail in FIG. 11. In particular, the visible area request routine starts in step 1100 and proceeds to step 1102 where a local semaphore is acquired. The window object subsequently checks the validity of the time stamp associated with the cached visible area as illustrated in step 1104. A decision is made in step 1106 regarding the time stamp and, if the time stamp is current, indicating that the cached visible area is valid, the routine proceeds to step 1106 where the cached visible area is used. The routine then proceeds to step 1122 where the local semaphore is released and the routine finishes in step 1124.

Alternatively, if the comparison step 1106 indicates that the cached time stamp is not current, then a request must be made to the visible area manager to obtain a new visible area. The request routine starts in step 1110 in which the window ID of the window to contain the new visible area is streamed over the data stream to the window manager. The routine then proceeds to step 1112 in which a request is made to the visible area manager to retrieve the new visible area. In step 1114, the window object checks the returning data stream to see whether a new visible area is available (generally indicated by a preceding flag). If, a new visible area is not available, then the cached visible area stored in the window object is set empty or cleared in step 1120. The routine then releases the local semaphore in step 1122 and finishes in step 1124.

Alternatively, if there is a new visible area available as indicated in step 1116, the routine then proceeds to step 1118 where the new visible area is read from the returning stream and stored in the local cache memory of the window object. The routine then proceeds to step 1122 where the local semaphore is released and finishes in step 1124.

Figure 12:
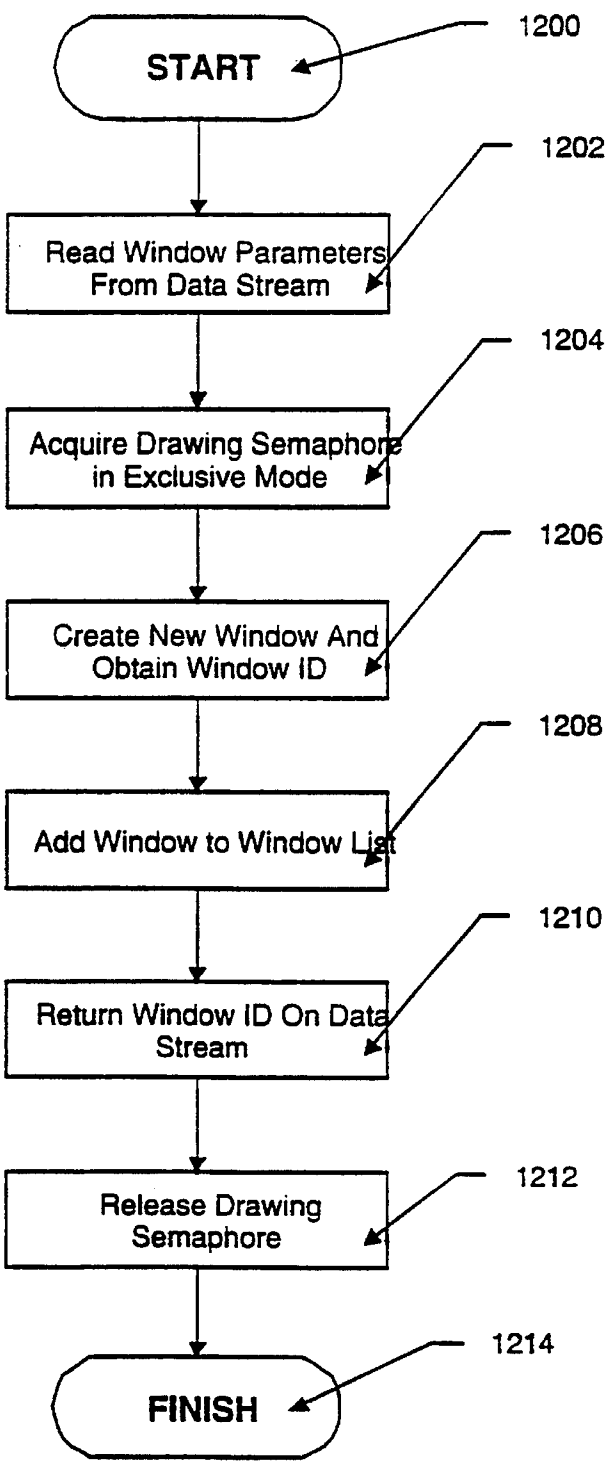
FIG. 12 is an illustrative flow chart of the method by which a window object creates a new window by interaction with the window manager.

FIG. 12 is a flow chart of an illustrative routine used by the window manager to create a new window on request from the window object. The routine starts in step 1200 and proceeds to step 1202 where the window parameters generated by the window object and streamed to the window manager are read from the incoming data stream. Next, in step 1204, the window manager acquires the global drawing semaphore in the exclusive mode. As previously mentioned, the acquisition of the drawing semaphore in the exclusive mode blocks all applications from drawing until the window manager has finished. This concurrency control prevents the applications from modifying the screen buffer as the new window is being created. The interlock is necessary because the new window may change the visible areas of the remaining windows and thereby trigger a recalculation of the visible areas.

After the drawing semaphore has been acquired, the routine proceeds to step 1206 where a new window is created thereby generating a new window ID. This window ID is added to the window list in step 1208. The ID is also streamed back to the window object in step 1210. The creation of a new window is performed by first creating an invisible window and then making the window visible. The step of changing the window visibility from invisible to visible triggers a recalculation of the window visible areas as will be discussed further herein in detail. Finally, in step 1212, the drawing semaphore is released and the routine finishes in step 1214.

Figure 13:
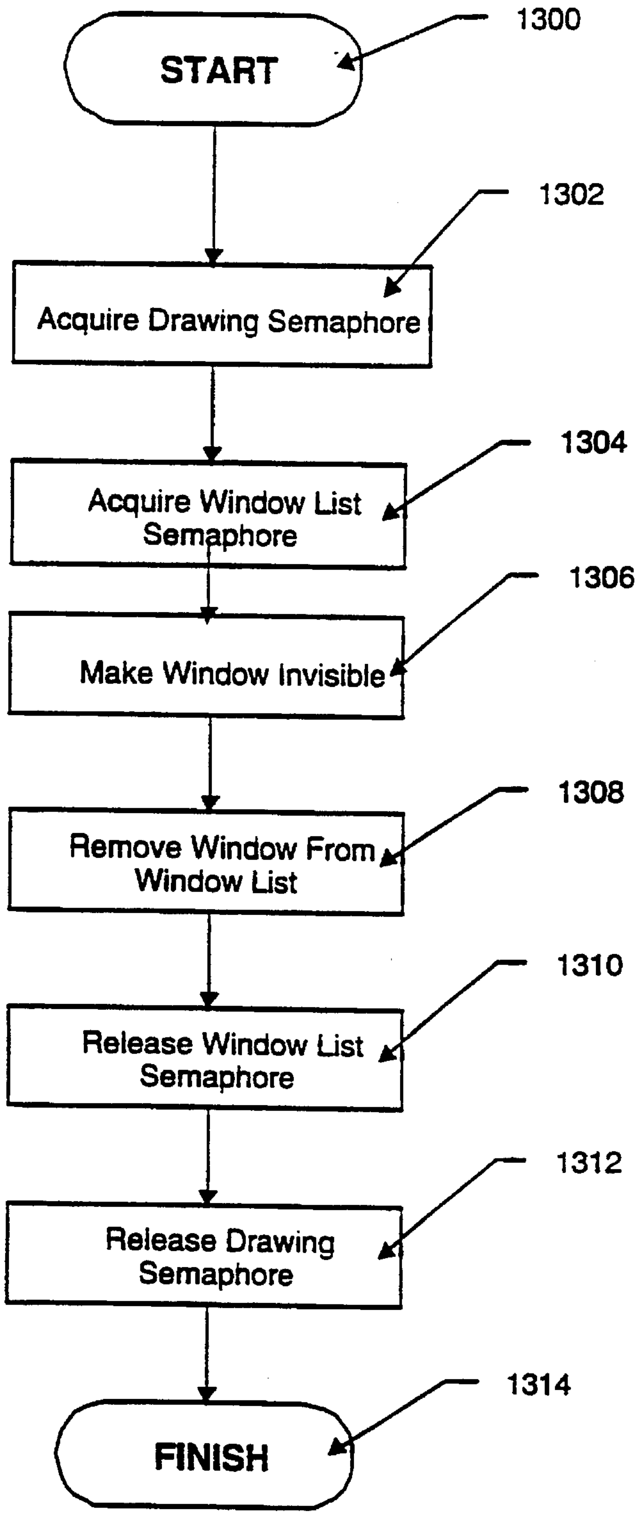
FIG. 13 is an illustrative flow chart of the method by which a window object deletes a window by interaction with the window manager.

The flow chart of FIG. 13 shows an illustrative routine used by the window manager for deleting a window in response to a request from a window object. The routine starts in step 1300 and proceeds to step 1302 where the global drawing semaphore is acquired in the exclusive mode. The routine then proceeds to step 1304 where the window list semaphore is acquired. Next, in step 1306, the window is made invisible, and the routine then proceeds to step 1308, where the window is removed from the window list by deleting the window ID associated with the window. The window list semaphore is then released in step 1310, the drawing semaphore is released in step 1312 and the routine then proceeds to finish in step 1314.

Figure 14:
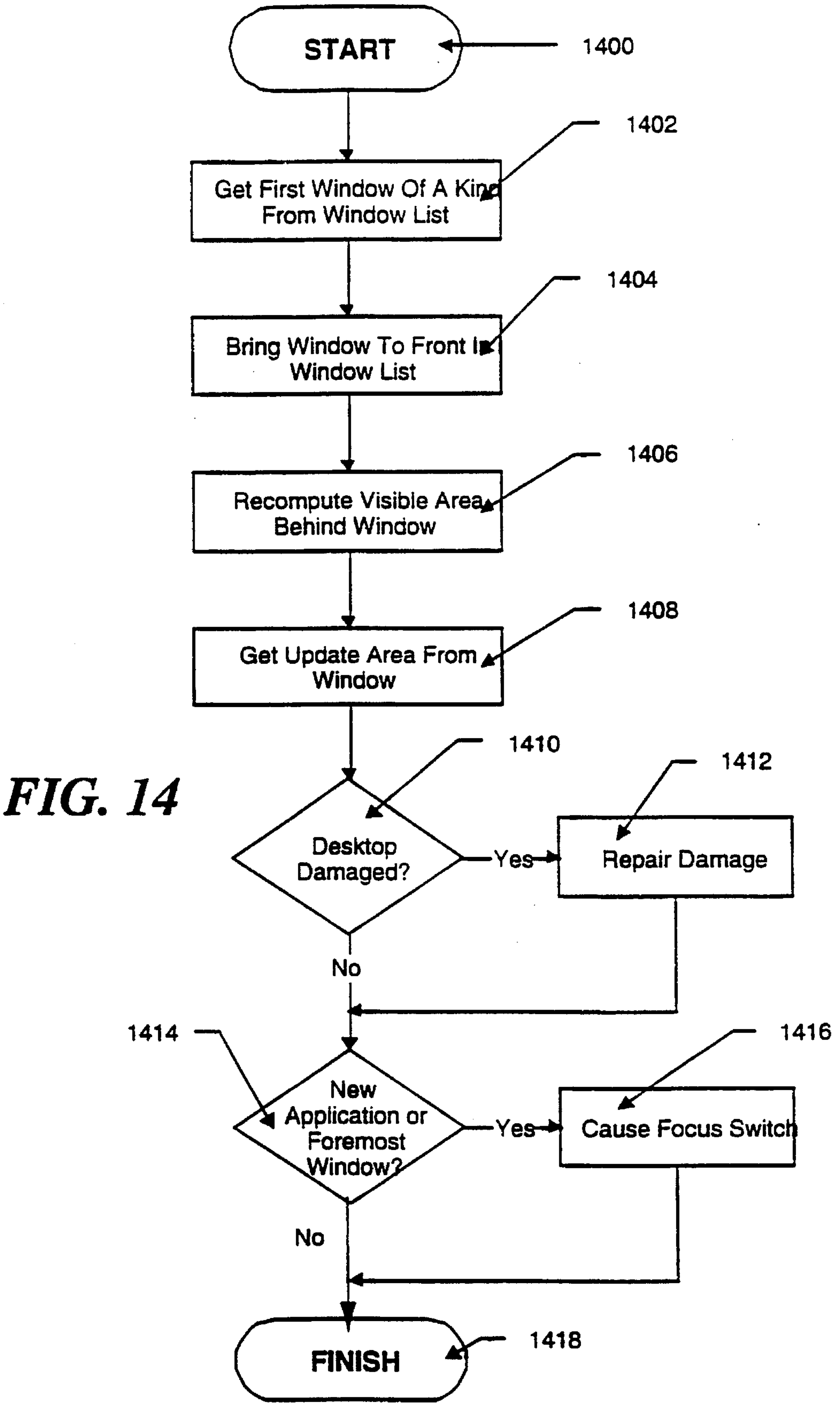
FIG. 14 is an illustrative flow chart of the method by which the visual area manager and the window manager rearranges the window display to bring us a selected window to the front of other windows.

FIG. 14 illustrates a flowchart of a routine used by the window manager to bring a specified window to the front of the window kind layer. The routine starts in step 1400 and proceeds to step 1402 where the window list is examined in order to get the first window of the same kind as the window which is to be moved to the front. Next, in step 1404, the selected window is brought to the front of the kind layer in the window list. This change is accomplished by examining the window list and moving the window towards the front until the kind place holder is reached. Since moving a window to the front may affect the visible areas of the windows which lie behind the moved window, the routine then proceeds to step 1406 where the visible areas of the windows lying behind the selected window are recomputed (in a manner as will hereinafter be described).

Next in step 1408 the update area associated with the window is obtained from the window object. This update area is compared to the desktop area to determine whether the desktop has been "damaged", that is, whether an area of the desktop is now uncovered and must be repainted to the selected desktop color. The routine, in step 1410, determines whether the desktop has been damaged by mathematically comparing the update area of the selected window to the desktop area. If damage has occurred, the routine proceeds to step 1412 where the damage is repaired (generally by repainting the desktop damaged area utilizing a predetermined color).

In either case, the routine proceeds to step 1414 where a determination is made whether the newly-moved window is associated with a new application or has become the foremost window. If so, a "focus" switch is generated in step 1416. The focus switch is generally initiated by sending a message to the operating system and a focus switch is often associated with a visual change in the selected window (for example, the window caption or menu bar may become a different color). The routine then proceeds to finish in step 1418.

Figure 15:
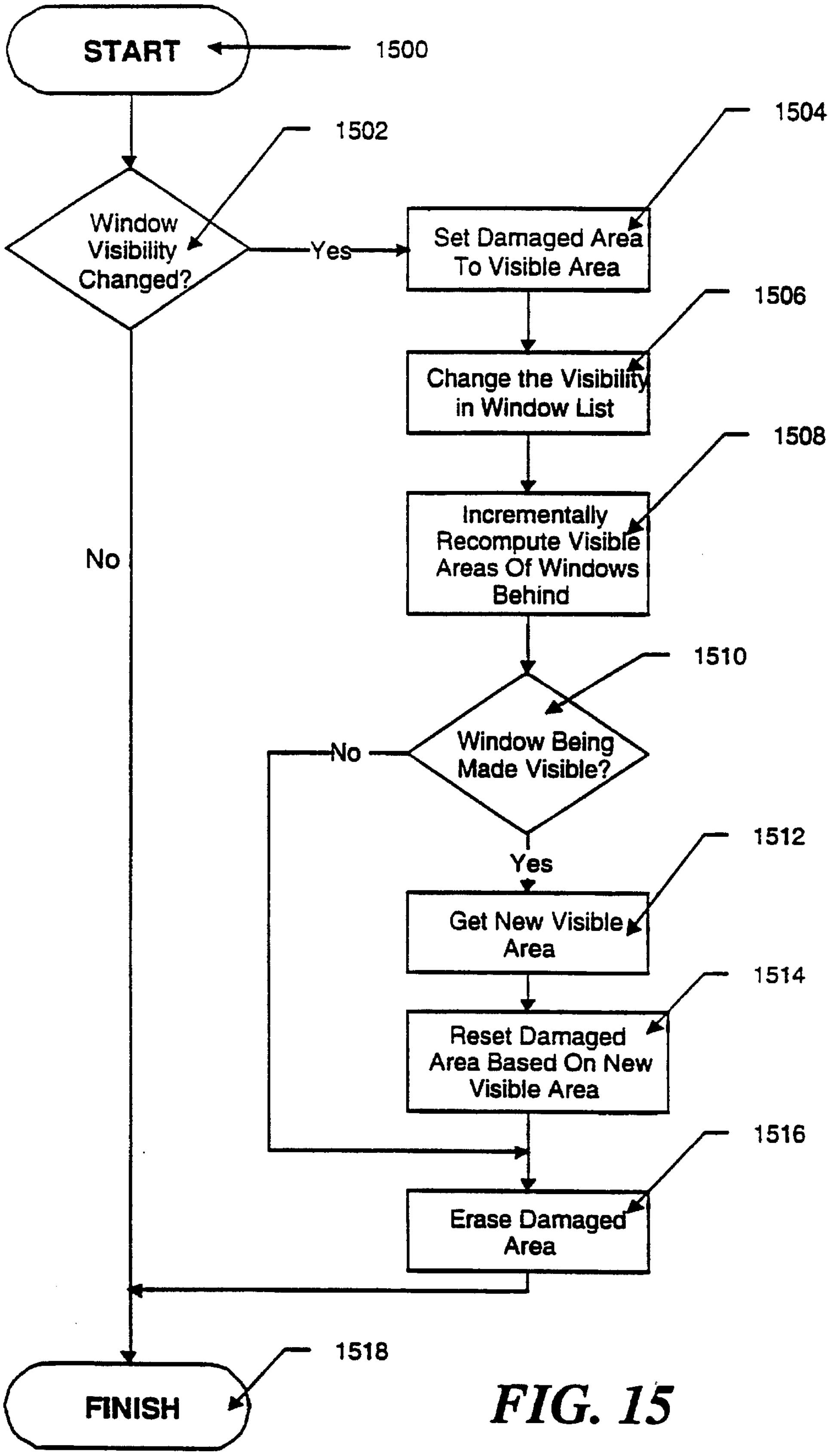
FIG. 15 is an illustrative flow chart of the method by which a new window is activated by the visible area manager located in the window manager.

FIG. 15 is a flowchart of an illustrative routine utilized by the visible area manager in order to change the visibility of a window. The illustrative routine starts in step 1500 and proceeds to step 1502 whether a determination is made whether the request received from the window object to change visibility actually results in a change of visibility. For example, if a window, which is already invisible, is requested to be made invisible, no change is required. Similarly, if a window is already visible and a request to make it visible is received again no change is required. If no change is required, the routine proceeds directly to the finish in step 1516.

If, in step 1502, it is determined that a change in visibility is actually required, then the routine proceeds to step 1504 where a "damaged" area variable is set to the visible area of the window. The damaged area variable will be used later to repair any damage to the desktop as will hereinafter be described. The routine then proceeds to step 1506 where a visibility variable stored in the window list is changed to indicate the new visibility. Next, in step 1508, the visible areas of the windows behind the window which is changed are incrementally recomputed as will hereinafter be described.

The window visibility routine then proceeds to step 1510 in which a check is made to determine whether the window is being made visible. If not, the damage variable set in step 1504 represents the correct "damage" because the window is being made invisible and the entire visible area disappears. Accordingly, the routine proceeds to 1516 in which a request is made to the window manager to erase the damaged area.

Alternatively, if, in step 1510, it is determined that the window is being made visible, then the damaged area variable must be adjusted to account for the fact that a portion of the damaged area will be covered by the newly-visible window. In this event, the routine proceeds to step 1512 where the new visible area is obtained by recalculating it. The routine then proceeds to step 1514 where the "damaged" area is reset based on the new visible area. In particular, if the newly-visible window has created damage to the desktop, the damaged area variable is exclusive-ORed (XORed) with the visible area. Otherwise, the damaged area variable is reduced by the new visible area by subtraction. The routine then proceeds to step 1516 in which the window manager is requested to erase the desktop damage. The routine then proceeds to step 1518 to finish.

Figure 16:
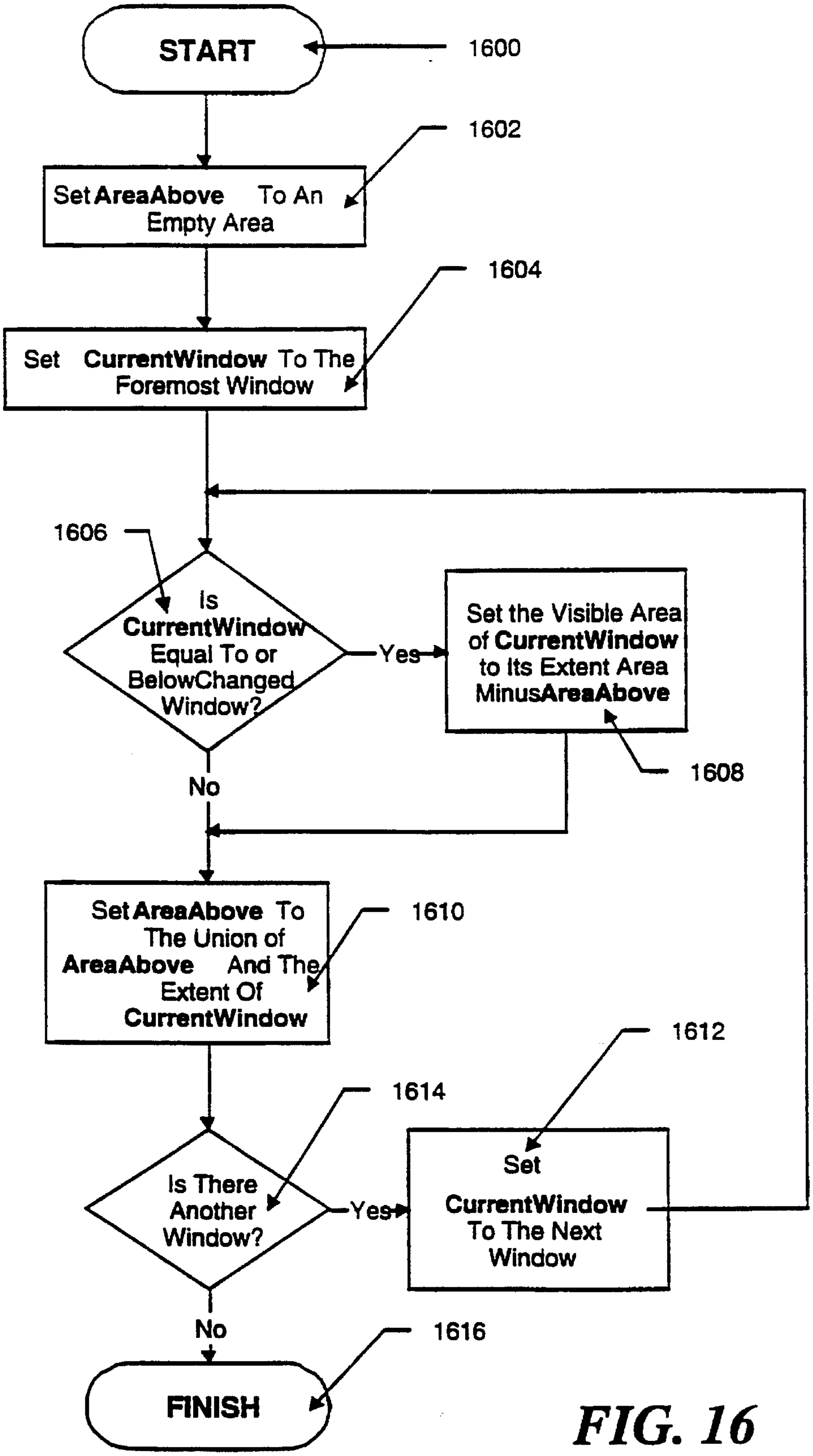
FIG. 16 is an illustrative flow chart of the method by which the visible area manager computes the new visible area when the new window ordering or size changes.
Figure 17:
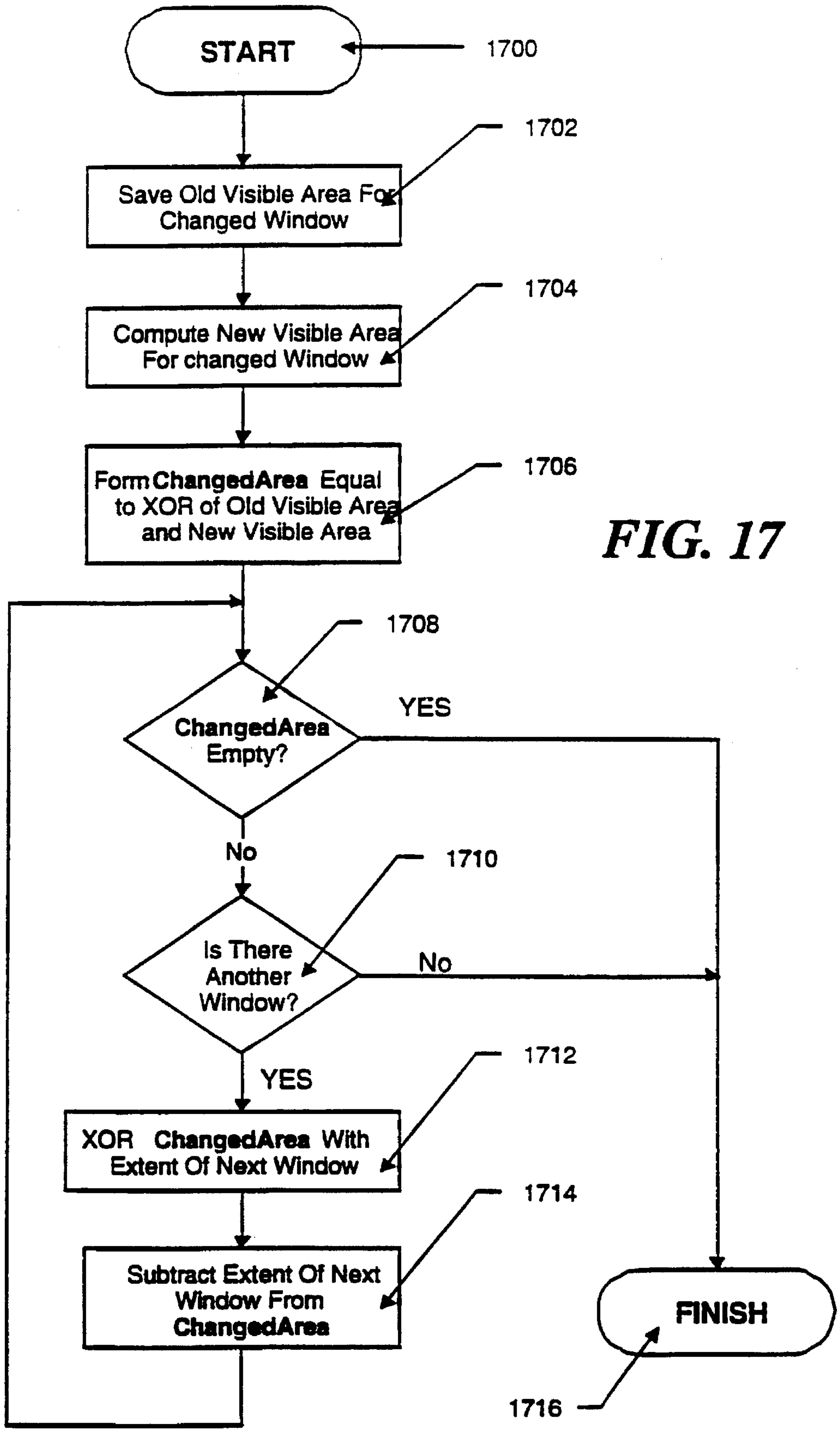
FIG. 17 is an illustrative flow chart of the method used by the visible area manager to compute the new visible area of a window in which only one window changes.

FIGS. 16 and 17 illustrate two routines used by the visible area manager to recompute window visible areas when a window has been changed. The routine shown in FIG. 16 can be used to recompute the visible areas of all the windows behind a changed window in all conditions, but it is slower than the routine shown in FIG. 17. The routine shown in FIG. 17 is used to recompute visible areas when only a single window has been resized or moved. The routine shown in FIG. 17 is faster fewer calculations are required. The routine shown in FIG. 16 utilizes two variables: AreaAbove and CurrentWindow. The CurrentWindow variable represents the "current window" on which the visible area manager is working and the AreaAbove variable represents the total area of the windows which are "above" or closer to the front than the current window. The visible area manager uses the routine shown in FIG. 16 to recompute the visible areas of every window behind the changed window regardless of whether the visible area has actually changed because no mechanism is used in the routine shown in FIG. 16 to detect when a change to one window cannot have affected the visible area of another window.

In particular, the routine starts in step 1600 and proceeds to step 1602 where the AreaAbove variable is cleared. Next, in step 1604, the CurrentWindow variable is set to the first or front window that appears on the display screen. The routine then proceeds to step 1606 where a check is made to determine whether the new CurrentWindow (which is now the foremost window) is the window that has been changed. If the CurrentWindow is the changed window, the routine proceeds to step 1608 in which the visible area of the CurrentWindow is computed by subtracting the AreaAbove variable from the current window extent (the full area of the window). In the case where the current window is the foremost window, the AreaAbove variable has been cleared (in step 1602) so that the visible area computed in step 1608 is simply the foremost window extent area. The routine then proceeds to step 1610 where the AreaAbove variable is corrected to take into account the effect of the changed current window. This correction is performed by setting the AreaAbove variable to the union of the AreaAbove variable and the extent of the current window. The routine then proceeds to step 1614 where the window list is checked to determine whether there is another window behind the current window. If so, the CurrentWindow variable is set to this next window in step 1612 and the routine returns to step 1606 to recompute the visible area of the new current window. Alternatively, if, in step 1614 there are no windows remaining, the routine finishes in step 1616.

The incremental routine shown in FIG. 17 illustrates a method of incrementally computing the visible areas of the windows to improve performance in certain situations. The incremental method works by first computing the new visible area for the changed window using a routine such as that shown in FIG. 16. Then the incremental routine computes the exclusive-OR of the changed window old visible area and new visible area. This "changed area" represents the area affected by the change to the window. Finally, the incremental routine shown in FIG. 17 applies the affected or changed area to each of the windows behind the changed window. Since only the affected area is applied to the subsequent windows, a performance improvement can be achieved in two ways. First, if a window extent area does not intersect the affected or changed area, then nothing has to be done with that window visible area. A check to determine this eliminates certain calculations involving unaffected windows. Secondly, a check can be made to determine whether the affected area or changed area becomes empty. If it does, the routine can be terminated even if it hasn't reached the final window on the list. The routine is shown in detail in FIG. 17 and starts in step 1700. The routine then proceeds to step 1702 where the old or original visible area for the changed window is saved. Next, in step 1704, a new visible area is computed for the changed window. The computation of the new visible area can be done by using a routine such as that shown in FIG. 16. In particular, the routine shown in FIG. 16 can be used by iterating through the loop comprised of steps 1606–1614 until step 1606 indicates that the current window is the changed window. At that time, the visible area computed in the step 1608 is used in step 1704. Next, in step 1706, a variable denoted as "ChangedArea" is computed equal to the exclusive-OR of the old visible area stored in step 1702 and the new visible area computed in step 1704. This ChangedArea variable is then used to modify all of the windows located below the changed window. To that end, the routine proceeds to step 1708 where a check is made to determine whether the ChangedArea variable is empty. If so, the routine is finished in step 1716.

If in step 1708, it is determined that the ChangedArea variable is not empty, the routine proceeds to step 1710 where the window list is checked to determine whether another window remains in the list. If there is another window, the visible area of the next window is computed by exclusive-ORing the ChangedArea variable with the extent of the next window as shown in step 1712. Next, the ChangedArea variable is updated by subtracting the extent of the next window from the ChangedArea variable as shown in step 1714. The routine then proceeds to process the next window in the list by first determining whether the new ChangedArea variable is empty in step 1708. If it is, the routine finishes in step 1716, if not, the next window is processed. The operation continues in this matter until either the ChangedArea variable becomes empty or there are no more windows remaining in the window list.

While the invention is described in terms of preferred embodiments in a specific system environment, those skilled in the art will recognize that the invention can be practiced, with modification, in other and different hardware and software environments within the spirit and scope of the appended claims.

Having thus described our invention, what we claim as new, and desire to secure by Letters Patent is:

1. A computer system for controlling a display device to generate a display having a plurality of window areas displayed on a desktop background, each of the plurality of window areas displaying screen information generated by one of a plurality of application programs, the computer system comprising:

a memory;

screen buffer storage apparatus having a plurality of storage areas, each of the plurality of storage areas having a size and storing the screen information for one of the plurality of window areas, the stored screen information being used by the display device to generate the display;

a processor controlled by the plurality of application programs, wherein each of the plurality of application programs comprises means for directly storing the screen information in the storage areas of the screen buffer storage apparatus;

an operating system cooperating with the processor for controlling the display device;

means, responsive to a change in a window area, for communicating the window area change to the plurality of application programs so that the plurality of application programs may respond to the window area change a window object in the memory and associated with each of the plurality of windows, each window object including window data and window functions and being created by an application program, wherein the window object comprises a mechanism for receiving a request from one of the plurality of application programs and apparatus responsive to a received request for providing a storage area location and size to the one of the plurality of application programs which made the request, wherein the window data comprises a copy of the storage area size of the associated window and wherein the window object further comprises apparatus responsive to a request from one of the plurality of application programs for determining the validity of the storage area size copy, wherein the means for communicating comprises apparatus for storing, with each storage area size, a first time stamp indicating the time at which the storage area size was recalculated, and wherein the window object comprises apparatus for storing with the storage area size copy a second time stamp indicating the time at which the storage area size copy was stored in the window object.

2. A computer system according to claim 1 wherein the validity determining apparatus comprises apparatus responsive to a request from an application program for a selected storage area size corresponding to a window for retrieving a first time stamp stored with the selected storage area size from the means for communicating and apparatus responsive to the retrieved first time stamp for comparing the retrieved first time stamp to the second time stamp stored in the window object.

3. A computer system according to claim 2 wherein the validity determining apparatus further comprises means for retrieving the storage area size stored in the means for communicating when the time stamp comparing apparatus indicates that the storage area size stored in the window object is not valid.

4. A computer system for controlling a display device to generate a display having a plurality of window areas displayed on a desktop background, each of the plurality of window areas displaying screen information generated by one of a plurality of application programs, the computer system comprising:

a memory;

screen buffer storage apparatus having a plurality of resizable storage areas, each of the plurality of resizable storage areas having a size and each storing the screen information for one of the plurality of window areas;

a processor controlled by the plurality of application programs to receive screen information from a selected one of the plurality of application programs and to store the received screen information in one of the plurality of resizable storage areas corresponding to the selected one application program;

an operating system cooperating with the processor for controlling the display device;

a means, having a shared data area for storing the storage area sizes and being responsive to a change in a storage area size of one storage area, for changing a storage area size of at least one other storage area;

a window object created in the memory by each of the plurality of application programs, the window object, upon creation, cooperating with the means for changing to create a window area by allocating one of the plurality of storage areas;

wherein the means for changing is created by the operating system;

wherein the window areas are overlapped and visually appear to have a front to back ordering and wherein the means for changing comprises a mechanism for maintaining each of the plurality of windows in an ordered list having a plurality of list positions where each list position corresponds to a position in the front to back ordering;

wherein the means for changing comprise apparatus, responsive to a change in position and size of one of the plurality of window areas, for calculating a changed window area indicating a portion of the one of the plurality of window areas which is modified by the change in position and size, the means for changing further comprising apparatus responsive to the changed window area for recalculating the storage area size of storage areas corresponding to window areas which appear behind the one window area as determined by the ordered list;

wherein the recalculating apparatus recalculates the storage area size by combining the changed area with the stored area sizes corresponding to window areas which appear behind the one window area as determined by the ordered list;

wherein each of the plurality of window objects comprises a cache memory and a plurality of methods for manipulating the window areas;

wherein information is transferred between each window object and the means for changing by means of data stream objects;

wherein each window object comprises a mechanism for receiving a request from one of the plurality of application programs and apparatus responsive to a received request for providing a storage area location and a storage area size to the one of the plurality of application programs which made the request; and wherein a copy of the storage area size of the associated window is stored in the window object cache memory and the window object comprises apparatus responsive to a request from one of the plurality of applications for determining the validity of the storage area size copy.

5. A computer system according to claim 4 wherein the validity determining apparatus comprises apparatus responsive to a request from an application program for a selected storage area size corresponding to a window for retrieving a first time stamp stored with the selected storage area size from the means for changing and apparatus responsive to the retrieved first time stamp for comparing the retrieved first time stamp to the second time stamp stored in the cache memory.

6. A computer system according to claim 5 wherein the validity determining apparatus further comprises means for retrieving the storage area size stored in the means for changing when the time stamp comparing apparatus indicates that the storage area size stored in the cache memory was stored before the last recalculation by the window manager object.

7. A computer system for controlling a display device to generate a display having a plurality of overlapped windows displayed on a desktop background, each of the plurality of windows having a visible area for displaying screen information generated by one of a plurality of application programs, the computer system comprising:

a memory;

a processor controlled by the plurality of application programs for controlling and coordinating the operation of the computer system;

an operating system cooperating with the processor for controlling the display device;

means, having a shared data area, for storing window visible areas and being responsive to a change in a visible area of one of the plurality of windows for changing the visible areas of others of the plurality of windows; and a window object in the memory and created by each of the plurality of application programs, each window object being associated with the one of the plurality of windows, and each window object including a cache memory for storing a copy of the visible area of the associated window;

wherein each window object comprises apparatus responsive to a request from one of the plurality of application programs for determining the validity of the window visible area copy;

wherein the means for storing comprises apparatus for storing with each window visible area, a first time stamp indicating a time at which the window visible area was last recalculated, and wherein the window object comprises apparatus for storing in the cache memory a second time stamp indicating the time at which the window visible area copy was stored in the cache memory.

8. A computer system according to claim 7 wherein the validity determining apparatus comprises apparatus responsive to a request from an application program for a selected window visible area for retrieving a first time stamp from the means for storing and apparatus responsive to the retrieved first time stamp for comparing the retrieved first time stamp to the second time stamp stored in the cache memory.

9. A computer system according to claim 8 wherein the validity determining apparatus further comprises means for retrieving the window visible area from the means for storing when the time stamp comparing apparatus indicates that the visible area stored in the cache memory was stored before the last recalculation by the window manager object.

10. A method for an application program to display screen information in one of a plurality of window areas displayed on a desktop background, each one of the plurality of window areas having a changeable visible area, the method comprising the steps of:

A. creating a window manager having a shared data area and being responsive to a change in a visible area of one window for changing the visible areas of at least one other window;

B. causing the application program to request the visible area of the one of a plurality of window areas from the window manager;

B1. creating a window object associated with each of the plurality of windows, each window object including window data and window functions and being created by an application program;

B2. causing the window object to request the visible area,

B2B. maintaining a cache copy of the visible area in the window object:

B2C. checking the cache copy in the window object before requesting a copy of the visible area from the window manager object;

B2D. storing with each window visible area, a first time stamp indicating the time at which the visible area was recalculated;

B2E. storing a second time stamp in the window object indicating the time at which the cache copy was stored in the window object; and C. causing the application program to display screen information only in the visible area obtained from the window manager.

11. A method according to claim 10 wherein step B2 comprises the steps of:

B2F. retrieving a first time stamp stored with a selected window visible area from the window manager when a request is received from an application program for a window visible area; and B2G. comparing the retrieved first time stamp to the second time stamp stored in the window object.

12. A method according to claim 11 wherein step B2 further comprises the steps of:

B2H. retrieving the window visible area stored in the window manager when the time stamp comparison of step B2G indicates that the cache copy stored in the window object is not valid.

* * * * *